(12) United States Patent
Ju et al.

(10) Patent No.: US 12,242,300 B2
(45) Date of Patent: Mar. 4, 2025

(54) ELECTRONIC DEVICE

(71) Applicant: SAMSUNG ELECTRONICS CO., LTD., Suwon-si (KR)

(72) Inventors: Wanjae Ju, Suwon-si (KR); Seunghak Lee, Suwon-si (KR); Chanho Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/609,013

(22) Filed: Mar. 19, 2024

(65) Prior Publication Data

US 2024/0219965 A1 Jul. 4, 2024

Related U.S. Application Data

(63) Continuation of application No. 17/492,709, filed on Oct. 4, 2021, now Pat. No. 11,940,840, which is a
(Continued)

(30) Foreign Application Priority Data

Feb. 25, 2019 (KR) ........................ 10-2019-0021873

(51) Int. Cl.
*G06F 1/16* (2006.01)
*G06F 1/18* (2006.01)
(Continued)

(52) U.S. Cl.
CPC .............. *G06F 1/165* (2013.01); *G06F 1/182* (2013.01); *G09G 3/3208* (2013.01);
(Continued)

(58) Field of Classification Search
CPC ........ G06F 1/165; G06F 1/182; G06F 1/1626; G06F 1/1698; G06F 21/32; G09G 3/3208;
(Continued)

(56) References Cited

U.S. PATENT DOCUMENTS 7,057,605 B2 6/2006 Erimei
7,969,382 B2 6/2011 Kim
(Continued)

FOREIGN PATENT DOCUMENTS

CA 2 974 416 1/2019
CN 105552526 5/2016
(Continued)

OTHER PUBLICATIONS

U.S. Appl. No. 17/592,709, filed Oct. 4, 2021, Ju et al.
(Continued)

*Primary Examiner* — Md K Talukder
(74) *Attorney, Agent, or Firm* — Nixon & Vanderhye P.C.

(57) ABSTRACT

Various embodiments relate to an electronic device. The electronic device may include: a housing including a first surface facing a first direction and a second surface facing a second direction opposite the first direction; a first display viewable through the first surface; a battery disposed between the first display and the second surface; a second display having a size smaller than a size of the first display and viewable through a partial area of the second surface; a short-distance wireless communication antenna disposed at a lower end of the second display and configured to transmit/receive a short-distance wireless communication signal through the partial area of the second surface and the second display; and a shield disposed at a lower end of the short-distance wireless communication antenna and configured to block transmission/reception of the short-distance wireless communication signal through the first surface.

20 Claims, 24 Drawing Sheets

Related U.S. Application Data continuation of application No. 16/800,157, filed on Feb. 25, 2020, now Pat. No. 11,137,798.

(51) Int. Cl.
| | |
|---|---|
| *G09G 3/3208* | (2016.01) |
| *H01Q 1/24* | (2006.01) |
| *H04M 1/72403* | (2021.01) |
| *H04W 12/72* | (2021.01) |

(52) U.S. Cl.
CPC ........ *H01Q 1/245* (2013.01); *H04M 1/72403* (2021.01); *H04W 12/72* (2021.01); *H04M 2250/16* (2013.01)

(58) Field of Classification Search
CPC ........ H01Q 1/245; H01Q 1/243; H01Q 1/526; H04M 1/72403; H04M 2250/16; H04M 1/72454; H04M 1/0262; H04M 1/026; H04M 1/0266; H04M 2250/04; H04W 12/72; H04B 5/48
See application file for complete search history.

(56) References Cited

U.S. PATENT DOCUMENTS

| | | | |
|---|---|---|---|
| 9,998,924 | B2 | 6/2018 | Kim et al. |
| 10,326,866 | B2 | 6/2019 | Lee et al. |
| 10,446,093 | B2 | 10/2019 | Lee et al. |
| 10,476,026 | B2 | 10/2019 | Lee |
| 10,505,277 | B2 | 12/2019 | Lee et al. |
| 11,079,796 | B2 | 8/2021 | Choe |
| 11,137,798 | B2 | 10/2021 | Ju et al. |
| 11,561,577 | B2 | 1/2023 | Cho |
| 11,940,840 | B2 * | 3/2024 | Ju ............ H04M 1/026 |
| 2005/0096087 | A1 | 5/2005 | Kim |
| 2009/0029736 | A1 | 1/2009 | Kim |
| 2009/0046146 | A1 | 2/2009 | Hoyt |
| 2009/0312020 | A1 | 12/2009 | Lee |
| 2011/0059777 | A1 | 3/2011 | Rao |
| 2011/0237326 | A1 | 9/2011 | Murakami |
| 2012/0309473 | A1 | 12/2012 | Choo et al. |
| 2015/0146707 | A1 | 5/2015 | Jung |
| 2015/0149802 | A1 | 5/2015 | Vayrynen |
| 2016/0142866 | A1 * | 5/2016 | Jang ............ H04B 5/263 455/41.1 |
| 2016/0372053 | A1 | 12/2016 | Lee et al. |
| 2017/0018258 | A1 | 1/2017 | Yeung |
| 2017/0214423 | A1 | 7/2017 | Park |
| 2017/0245141 | A1 | 8/2017 | Bai |
| 2017/0265079 | A1 | 9/2017 | Kim et al. |
| 2018/0234529 | A1 | 8/2018 | Yu et al. |
| 2019/0006756 | A1 | 1/2019 | Lee et al. |
| 2019/0037059 | A1 | 1/2019 | Machani |
| 2019/0097278 | A1 | 3/2019 | Park |
| 2019/0317553 | A1 | 10/2019 | Cho |
| 2019/0357306 | A1 | 11/2019 | Fong |
| 2020/0272198 | A1 * | 8/2020 | Ju ............ G06F 1/182 |
| 2022/0026947 | A1 * | 1/2022 | Ju ............ H04M 1/026 |
| 2023/0156985 | A1 * | 5/2023 | Wang ............ H05K 7/20963 455/566 |
| 2023/0336652 | A1 * | 10/2023 | Kang ............ H04M 1/0277 |

FOREIGN PATENT DOCUMENTS

| | | |
|---|---|---|
| CN | 105552526 A | 5/2016 |
| CN | 106155476 | 11/2016 |
| CN | 106257581 | 12/2016 |
| CN | 106657667 | 5/2017 |
| CN | 107004956 A | 8/2017 |
| CN | 108140930 | 6/2018 |
| CN | 108292800 A | 7/2018 |
| CN | 108494943 | 9/2018 |
| CN | 108769296 A | 11/2018 |
| CN | 108881560 | 11/2018 |
| DE | 20 2012 003 363 | 6/2012 |
| EP | 2 611 117 | 7/2013 |
| EP | 2 611 117 A1 | 7/2013 |
| JP | H09181637 | 7/1997 |
| JP | H09181637 A | 7/1997 |
| JP | 2007-004502 | 1/2007 |
| JP | 4445752 B2 | 1/2010 |
| JP | 2013-168715 | 8/2013 |
| JP | 6033603 | 11/2016 |
| KR | 20130008920 A | 1/2013 |
| KR | 10-2016-0051691 | 5/2016 |
| KR | 10-2017-0043449 | 4/2017 |
| KR | 10-2017-0105262 A | 9/2017 |
| KR | 10-2019-0004103 A | 1/2019 |

OTHER PUBLICATIONS

U.S. Appl. No. 16/800,157, filed Feb. 25, 2020; Ju et al.
International Search Report and Written Opinion dated Jun. 22, 2020 in counterpart International Application No. PCT/KR2020/002668.
Extended Search Report and Written Opinion dated Oct. 8, 2020 in counterpart European Patent Application No. EP20159335.7.
First Office Action dated Nov. 19, 2020 in counterpart Chinese Patent Application No. 202010118821.0.
Chinese Office Action dated Jun. 11, 2021 for CN Application No. 202010118821.0.
European Office Action dated Mar. 18, 2022 for EP Application No. 20159335.7.
Chinese Decision of Rejection dated Jan. 17, 2022 for CN Application No. 202010118821.0.
European Office Action dated Apr. 21, 2023 for EP Application No. 20159335.7.
Korean Office Action dated May 5, 2023 for KR Application No. 10-2019-0021873.
Korean Notice of Patent Grant dated Nov. 15, 2023 for KR Application No. 10-2019-0021873.
Extended European Search Report dated Jan. 29, 2024 for EP Application No. 23205255.5.

* cited by examiner

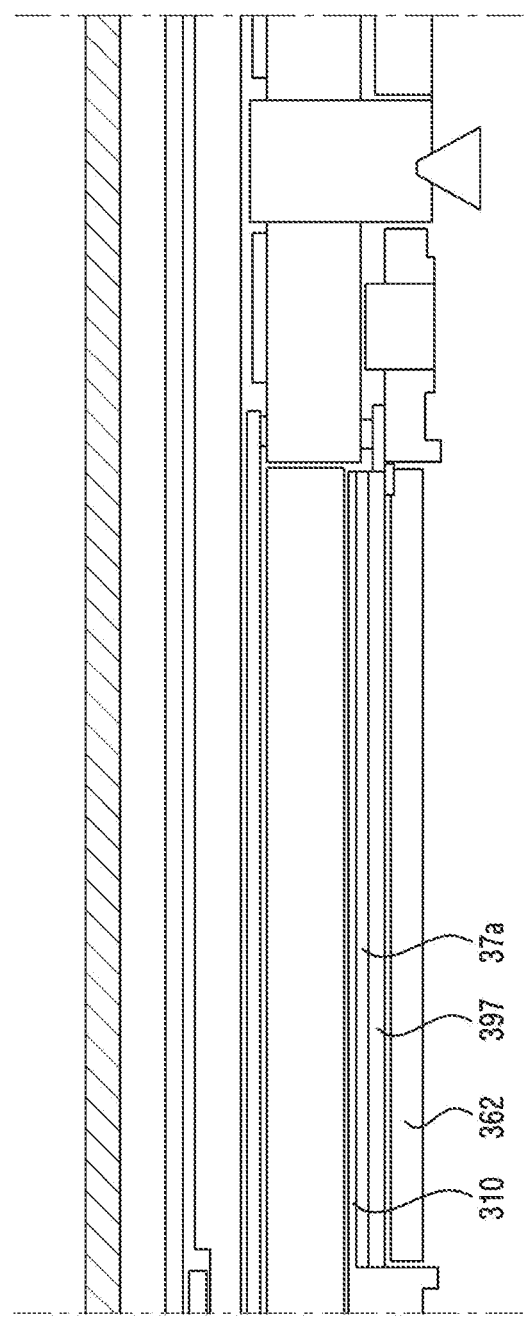

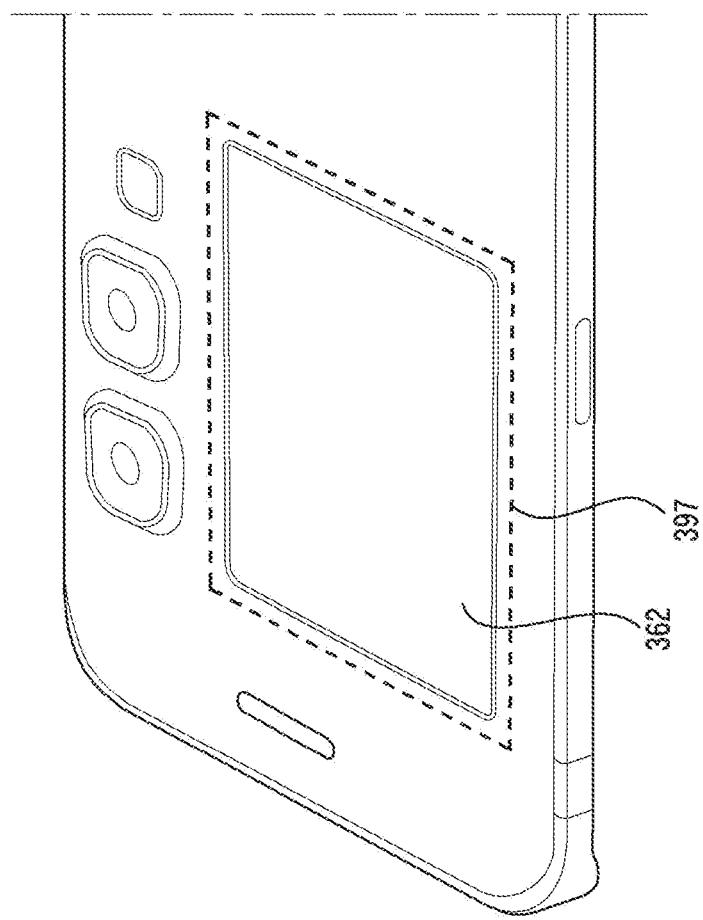

ELECTRONIC DEVICE

CROSS-REFERENCE TO RELATED APPLICATION

This application is a Continuation of U.S. application Ser. No. 17/492,709, filed Oct. 4, 2021 (now U.S. Pat. No. 11,940,840), which is a Continuation of application Ser. No. 16/800,157, filed Feb. 25, 2020 (now U.S. Pat. No. 11,137,798), which claims priority to KR 10-2019-0021873, filed Feb. 25, 2019, the entire contents of which are all hereby incorporated herein by reference in their entireties.

BACKGROUND

1) Field

The disclosure relates to an electronic device.

2) Description of Related Art

Electronic devices (for example, mobile terminals, smartphones, or wearable devices) may provide various functions. For example, smartphones may provide not only basic voice communication functions, but also functions for short-distance wireless communication (for example, Bluetooth, Wi-Fi, or near-field communication (NFC)), functions for mobile communication (third-generation (3G), 4G, or 5G), functions for playing music or moving images, functions for taking images, or functions for navigation.

There have recently been an increasing number of electronic devices having large screens. For example, recent electronic devices may have minimized bezel areas (or black matrix (BX) areas) so as to increase the size of the displays.

In general, an electronic device may have a display disposed on a first surface (for example, front surface) together with other elements (for example, a receiver, a front camera, a luminance sensor, or the like). The other elements may make it difficult to increase the size of the display of the electronic device. For example, the electronic device may include a display having a size reduced by a partial area in which the other elements are mounted, or may include a display, the form of a part of which is modified or removed (for example, punch hole) (for example, notch design).

The above information is presented as background information only to assist with an understanding of the disclosure. No determination has been made, and no assertion is made, as to whether any of the above might be applicable as prior art with regard to the disclosure.

SUMMARY

Embodiments of the disclosure provide an electronic device that can use substantially the entire first surface as a display area by disposing the other elements on the second surface (for example, rear surface).

An electronic device according to various example embodiments may have an additional display on the second surface, and may appropriately operate the display on the first surface and the display on the second surface based on the situation.

Embodiments of the disclosure may provide various structures for disposing a short-distance wireless communication antenna in connection with an electronic device including displays on the first and second surfaces, respectively.

An electronic device according to various example embodiments may include, for example: a housing including a first surface facing a first direction and a second surface facing a second direction opposite the first direction; a first display viewable through the first surface; a battery disposed between the first display and the second surface; a second display having a size smaller than a size of the first display and viewable through a partial area of the second surface; a short-distance wireless communication antenna disposed at a lower end of the second display and configured to transmit/receive a short-distance wireless communication signal through the partial area of the second surface and the second display; and a shield disposed at a lower end of the short-distance wireless communication antenna and configured to block transmission/reception of the short-distance wireless communication signal through the first surface.

An electronic device according to various example embodiments may include, for example: a housing including a first surface facing a first direction and a second surface facing a second direction opposite the first direction; a first display viewable through the first surface; a bracket supporting the first display; a short-distance wireless communication antenna disposed between the first display and the bracket and configured to transmit/receive a short-distance wireless communication signal through a partial area of the first surface and the first display; a shield disposed between the short-distance wireless communication antenna and the bracket and configured to block transmission/reception of the short-distance wireless communication signal through the second surface; and a second display having a size smaller than a size of the first display and viewable through a partial area of the second surface.

An electronic device according to various example embodiments may include, for example: a housing including a first surface facing a first direction and a second surface facing a second direction opposite the first direction; a first display viewable through the first surface; a bracket supporting the first display; a second display having a size smaller than a size of the first display and viewable through a partial area of the second surface; and a short-distance wireless communication antenna disposed in a bezel area of the second display and surrounding the second display.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 3D is a sectional view illustrating an example method for mounting a short-distance wireless communication antenna of an electronic device according to another embodiment;

FIG. 3G is a diagram illustrating an example of the short-distance wireless communication antenna in FIG. 3F according to various embodiments;

DETAILED DESCRIPTION

Figure 1:
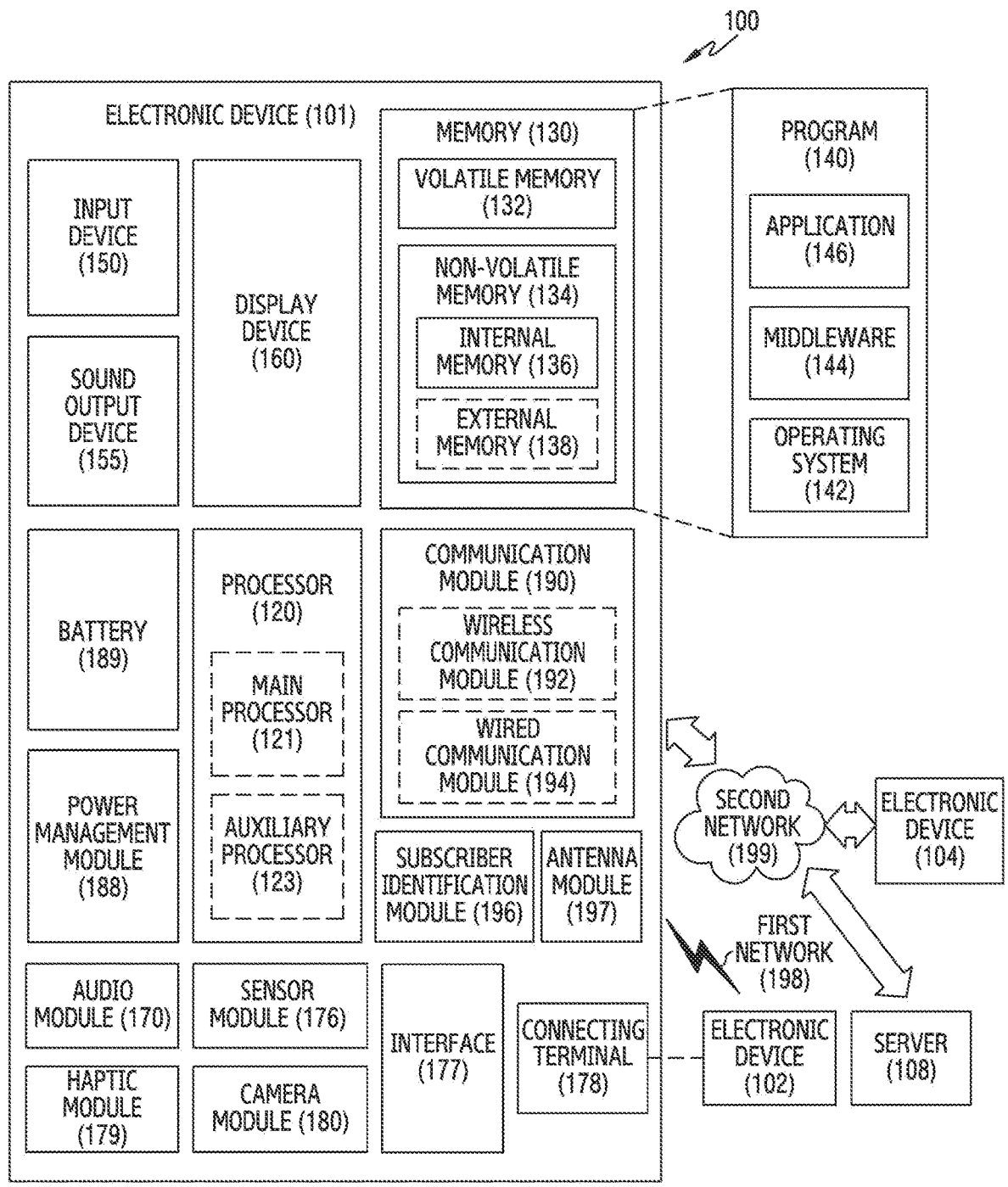
FIG. 1 is block diagram illustrating an example electronic device in a network environment according to an embodiment.

Hereinafter, various example embodiments will be described with reference to the accompanying drawings. Although this disclosure describes various example embodiments illustrated in the drawings in detail with reference thereto, the same is not for the purpose of limiting various embodiments to specific forms. For example, it would be apparent to a person skilled in the art to which the disclosure pertains that various embodiments can be variously modified.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
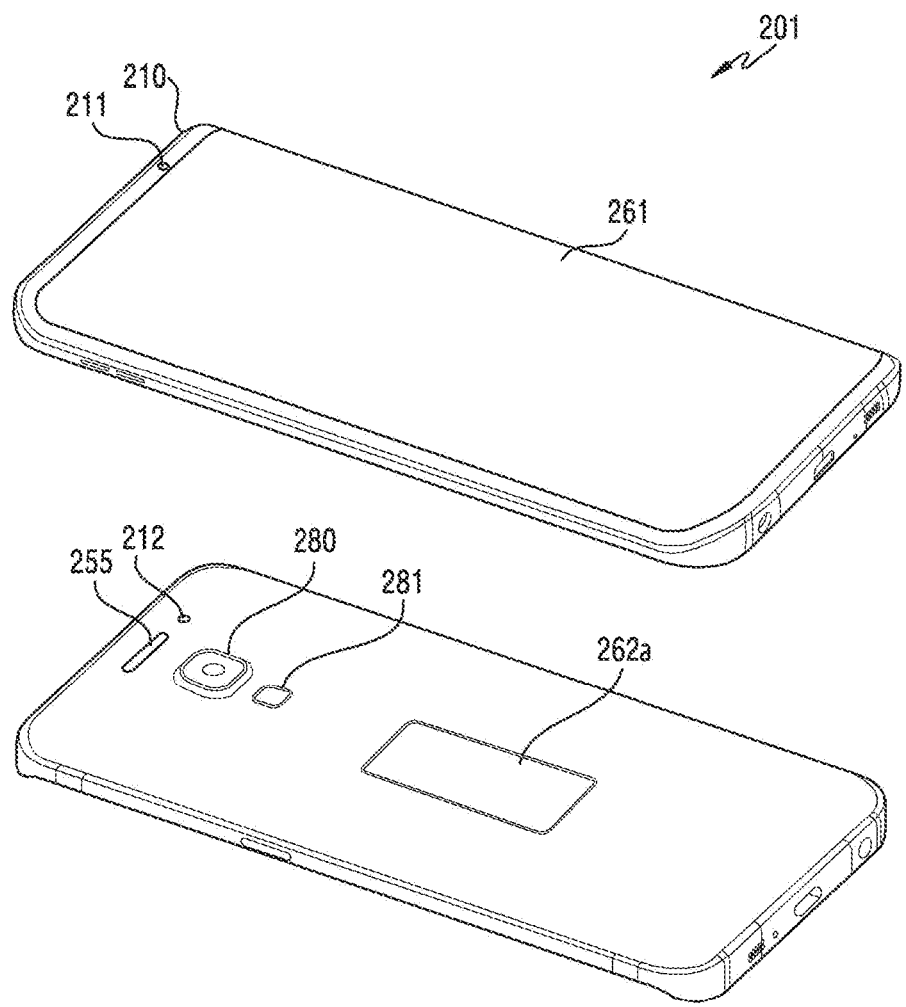
FIG. 2A is a diagram illustrating a perspective view of the exterior of an electronic device according to various embodiments.
Figure 2B:
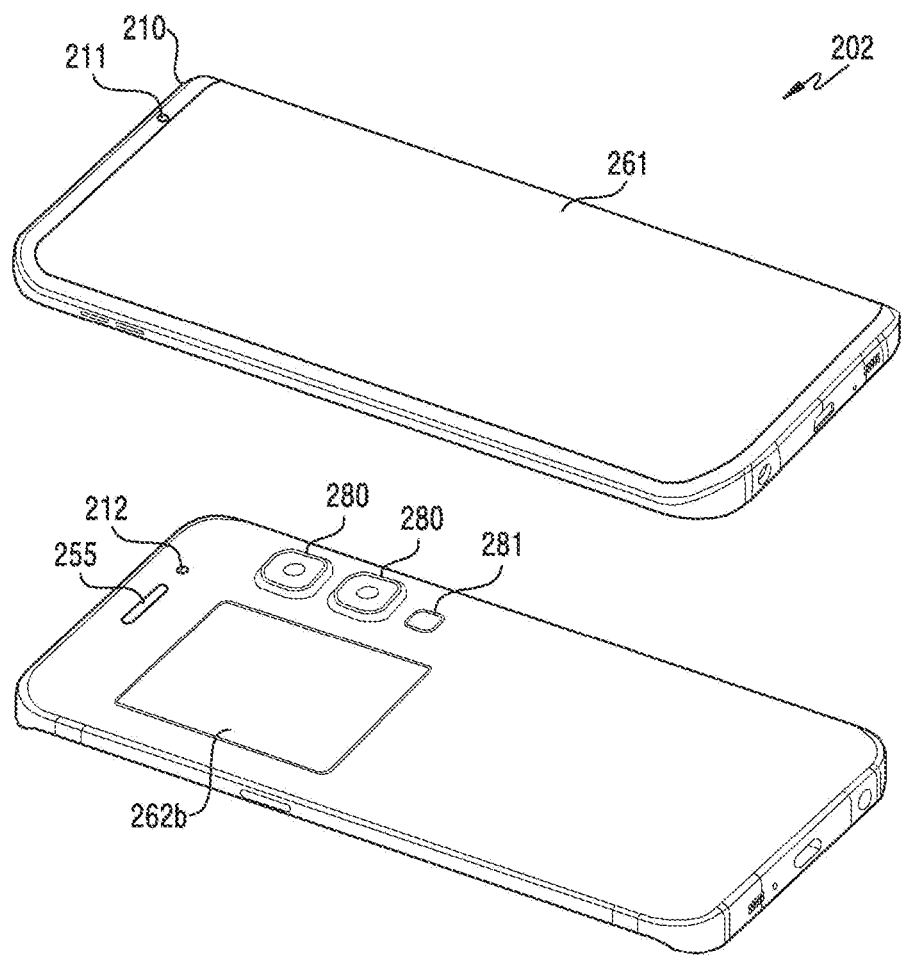
FIG. 2B is a diagram illustrating a perspective view of the exterior of an electronic device according to various embodiments.
Figure 2C:
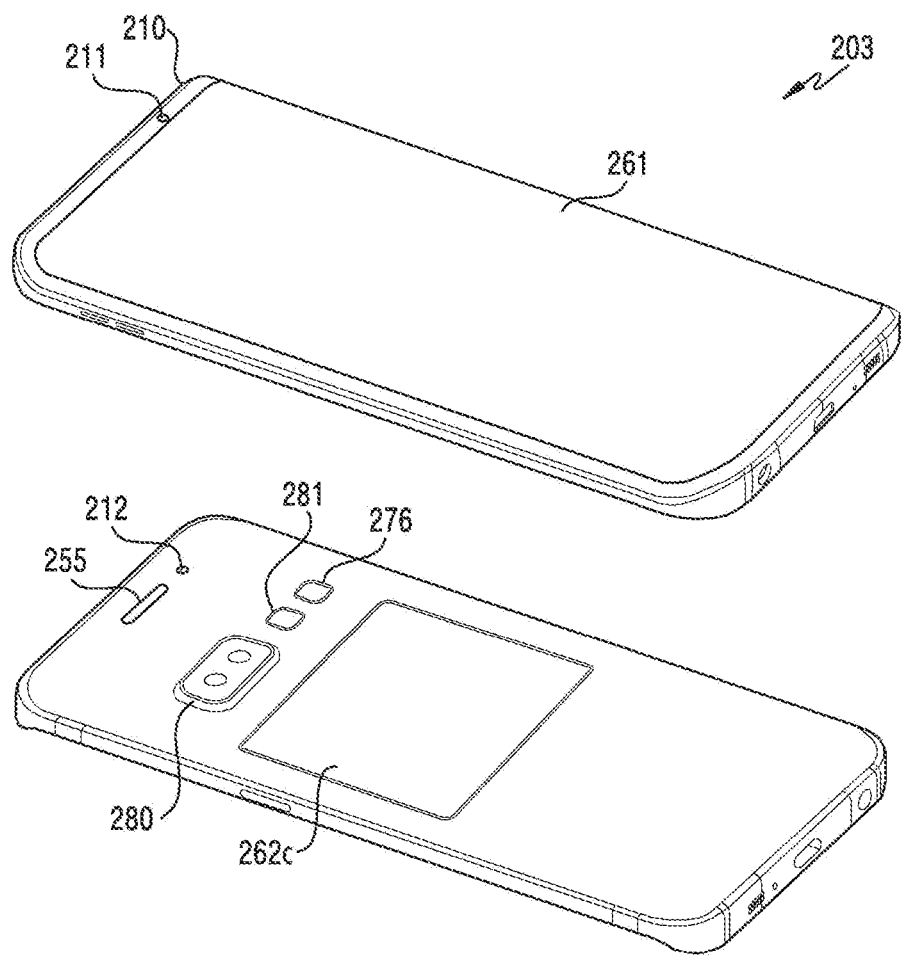
FIG. 2C is a diagram illustrating a perspective view of the exterior of an electronic device according to various embodiments.

FIG. 2A is a diagram illustrating a perspective view of the exterior of an electronic device according to various embodiments, FIG. 2B is a diagram illustrating a perspective view of the exterior of an electronic device according to various embodiments, and FIG. 2C is a diagram illustrating a perspective view of the exterior of an electronic device according to various embodiments.

Referring to FIG. 2A, 2B and FIG. 2C, the housing 210 of the electronic devices 201, 202, and 203 according to various embodiments (for example, electronic device 101) may include a first surface (for example, front surface) facing in a first direction and a second surface (for example, rear surface) facing in a second direction opposite to the first direction.

The electronic devices 201, 202, and 203 according to various embodiments may include a first display 261 exposed (or viewable) through substantially the entire area of the first surface. The electronic devices 201, 202, and 203 according to various embodiments may use all (or almost all (for example, 95% or more)) of the first surface as a display area because various elements (electronic components) (for example, receiver 255 and various sensors (for example, proximity sensor and luminance sensor)) conventionally disposed on the first surface are removed from the first surface. For example, various embodiments may use substantially all of the first surface as a display area without modifying the display as in the case of a notch design. The electronic devices 201, 202, and 203 according to various embodiments may include a first luminance sensor 211 on the upper end of the first surface. The first luminance sensor 211 normally has a very small size, and thus may not require form modification of the first display 261 as in the case of a notch design. In some embodiments, the first luminance sensor 211 may be disposed below the first display 261.

The electronic devices 201, 202, and 203 according to various embodiments may include various elements removed from the first surface, and second displays 262a, 262b, and 262c, on the second surface. The second displays 262a, 262b, and 262c may be exposed or viewable through a partial area of the second surface, and the various elements may be exposed through another area of the second surface.

The form (shape and size) of the second displays 262a, 262b, and 262c and the various elements included on the second surface may be diversified. For example, the first electronic device 201 may have, as illustrated in FIG. 2A, a receiver 255 and a second luminance sensor 212 disposed in the transverse direction on the upper end of the second surface, may have a camera module 280 disposed below the receiver 255, may have a flash 281 disposed on the lower end of the camera module 280, and may have a second display 262a disposed on the lower end of the flash 281 and elongated in the longitudinal direction (rectangular shape).

As another example, with reference to FIG. 2B, the second electronic device 202 may have a receiver 255 and a second luminance sensor 212 disposed in the transverse direction on the upper end of the second surface, may have a second display 262b disposed on the lower end of the receiver 255, and may have two (or three or more) camera modules 280 and a flash 281 disposed in the longitudinal direction next to the second display 262b.

As another example, the third electronic device 203 may have a receiver 255 and a second luminance sensor 212 disposed in the transverse direction on the upper end of the second surface, may have a camera module 280, a flash 281, and a fingerprint sensor 276 disposed in the transverse direction on the lower end of the receiver 255 and the second luminance sensor 212, and may have a second display 262c disposed on the lower end of the camera module 280, the flash 281, and the fingerprint sensor 276.

The user of the electronic devices 201, 202, and 203 according to various embodiments may make a voice call using the second surface on which the receiver 255 is disposed. In addition, the electronic devices 201, 202, and 203 according to various embodiments may have no separate camera module mounted on the first surface, and may enable the user to make a video call or to take selfies using the camera module 280 and the second displays 262a, 262b, and 262c disposed on the second surface.

The electronic devices 201, 202, and 203 may further include an antenna for short-distance wireless communication (for example, and without limitation, near-field communication (NFC), magnetic secure transmission (MST)), or a wireless charging antenna on the second or first surface.

Although the electronic devices 201, 202, and 203 illustrated in FIG. 2A, 2B and FIG. 2C have a first luminance sensor 211 disposed on the first surface, the first luminance sensor 211 may be omitted to further increase the size of the first display 261, or may be disposed on another area (for example, upper-end side surface) of the housing 210 of the electronic devices 201, 202, and 203.

Figure 3A:
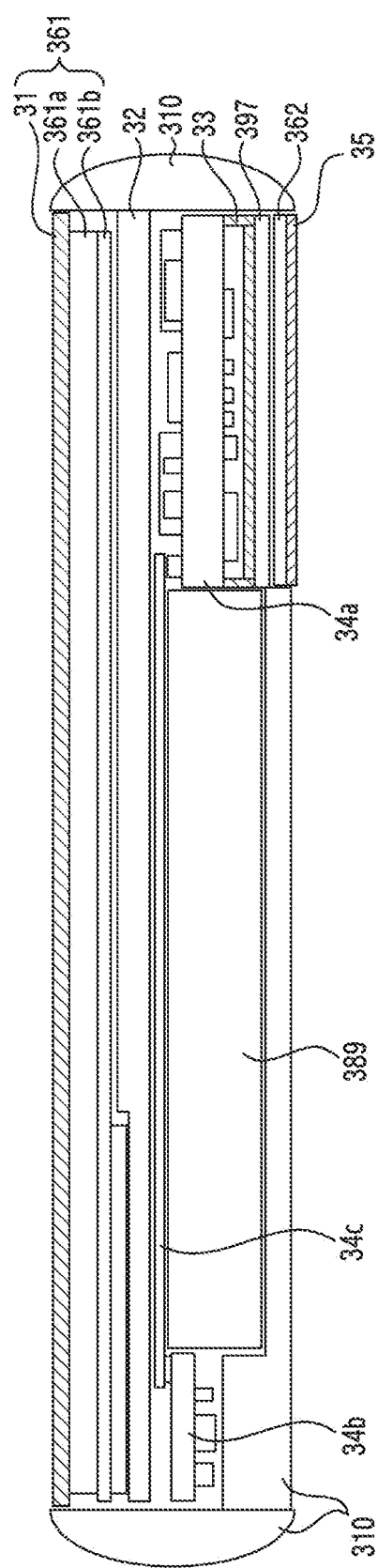
FIG. 3A is a sectional view illustrating an example method for mounting a short-distance wireless communication antenna of an electronic device according to an embodiment.

FIG. 3A is a sectional view illustrating an example method for mounting a short-distance wireless communication antenna of an electronic device according to an embodiment.

Referring to FIG. 3A, the electronic device according to an embodiment (for example, electronic device 101 or electronic devices 201, 202, and 203) may include a housing 310, a first display 361, a first protective window 31, a bracket 32, a support 33, a first printed circuit board 34a, a second printed circuit board 34b, a flexible printed circuit board 34c, a short-distance wireless communication antenna 397, a battery 389, a second display 362, and a second protective window 35.

The housing 310 may include a first surface and a second surface. The first display 361 may be exposed or viewable through the first surface of the housing 310. The first display 361 may include a heat-radiating sheet (not illustrated) for the purpose of diffusing heat inside the electronic device so as to lower the temperature therein or preventing and/or reducing the display panel 361a from a backlight bleeding, and/or various display sheets 361b for the purpose of blocking electromagnetic interference (EMI). The display sheets 361b may, for example, and without limitation, comprise a metal (for example, copper), film, graphite, or the like.

The first protective window 31 may protect the first display 361. The first protective window 31 may, for example, include reinforced glass. The bracket 32 may support the first display 361. The bracket 32 may at least partially include a metal.

The first printed circuit board 34a and the second printed circuit board 34b may be disposed inside the housing 310 such that at least one electronic component is mounted thereon. The flexible printed circuit board 34c may electrically connect the first printed circuit board 34a and the second printed circuit board 34b.

The battery 389 may be positioned inside the housing 310. For example, the battery 389 may be positioned between the bracket 32 and the second surface.

The second display 362 may be exposed or viewable through a partial area of the second surface of the housing 310. The second display 362 may include no structure that interferes with transmission/reception of radio signals (for example, display sheet 361b). For example, the second display 362 may include, for example, and without limitation, an organic light-emitting diode (OLED) display.

The second protective window 35 may protect the second display 362. The second protective window 35 may, for example, include reinforced glass.

The support 33 may be positioned between the first printed circuit board 34a and the second display 362 so as to support the second display 362. The support 33 may, for example, include a metal (for example, steel use stainless (SUS)).

The short-distance wireless communication antenna 397 may be positioned (or disposed) at the lower end of the second display 362. For example, the short-distance wireless communication antenna 397 may be disposed between the support 33 and the second display 362. The short-distance wireless communication antenna 397 may not transmit/receive radio signals through the first surface of the electronic device, due to the metallic support 33, and can transmit/receive radio signals through the second surface of the electronic device.

The electronic device according to an embodiment may include a wireless charging antenna (not illustrated) instead of the short-distance wireless communication antenna 397. The electronic device may include both the short-distance wireless communication antenna 397 and the wireless charging antenna on the lower end of the second display 362. Although not illustrated in FIG. 3A, the electronic device may include, for example, and without limitation, a receiver, a camera module, a sensor module, and the like on the second surface.

Figure 3B:
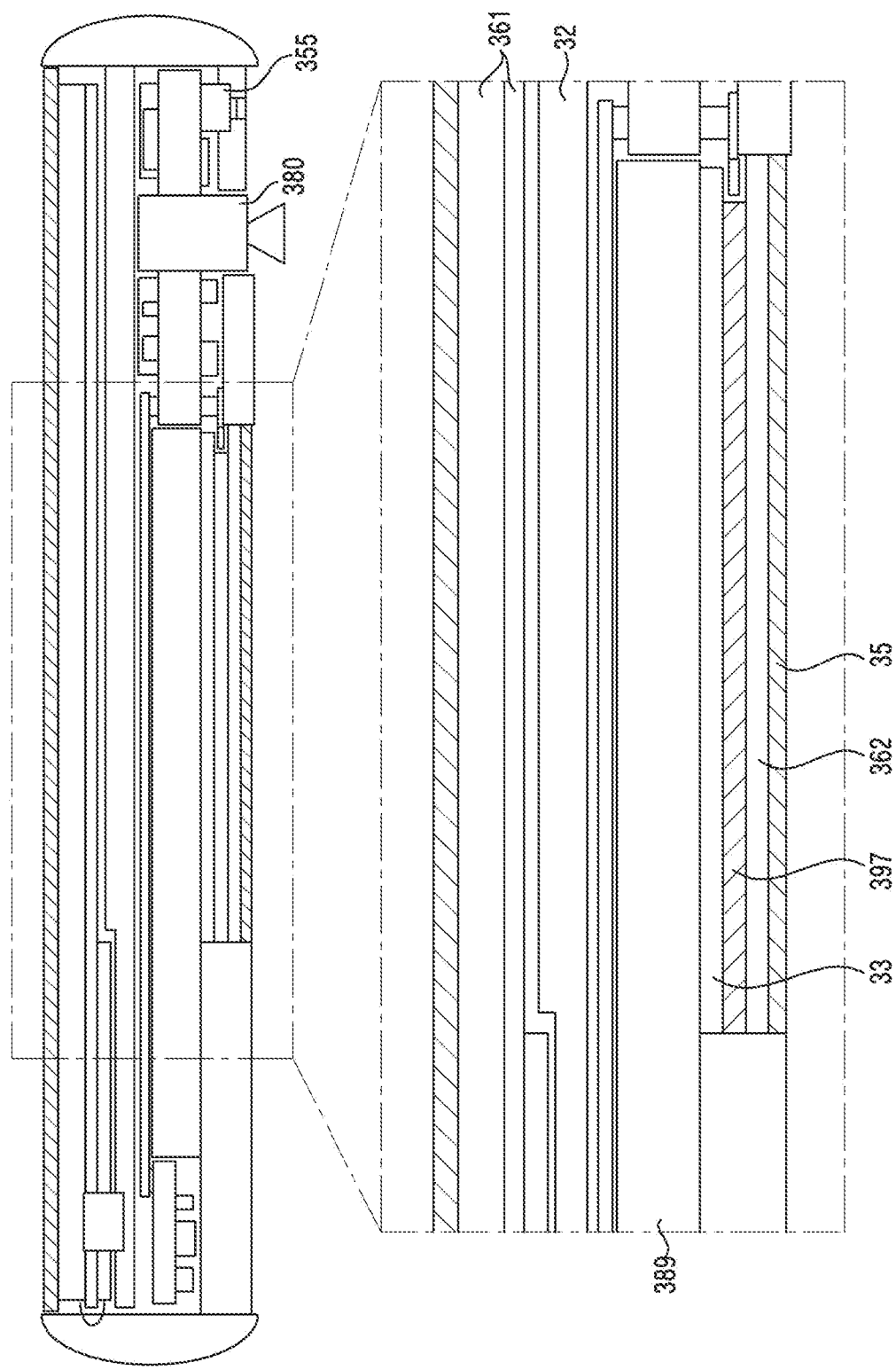
FIG. 3B is a sectional view illustrating an example method for mounting a short-distance wireless communication antenna of an electronic device according to another embodiment.

FIG. 3B is a sectional view illustrating an example method for mounting a short-distance wireless communication antenna of an electronic device according to another embodiment.

Referring to FIG. 3B, the electronic device according to another embodiment (for example, electronic device 101 or electronic devices 201, 202, and 203) may have a short-distance wireless communication antenna 397 mounted between a battery 389 and a second display 362. For example, a battery 389 may be disposed on the lower end of a bracket 32 supporting a first display 361, a support 33 may be disposed in a partial area of the lower end of the battery 389 so as to support the second display 362, and a short-distance wireless communication antenna 397 may be disposed between the support portion 33 and the second display 362. The short-distance wireless communication antenna 397 cannot transmit/receive radio signals through the first direction (first surface) due to the metallic bracket 32 and/or the first display 361. However, since the second display 362 includes no metal housing, the short-distance wireless communication antenna 397 can transmit/receive radio signals through the second direction (second surface).

The electronic device may further include a camera module 380 and a receiver 355 in a partial area of the second surface.

Figure 3C:
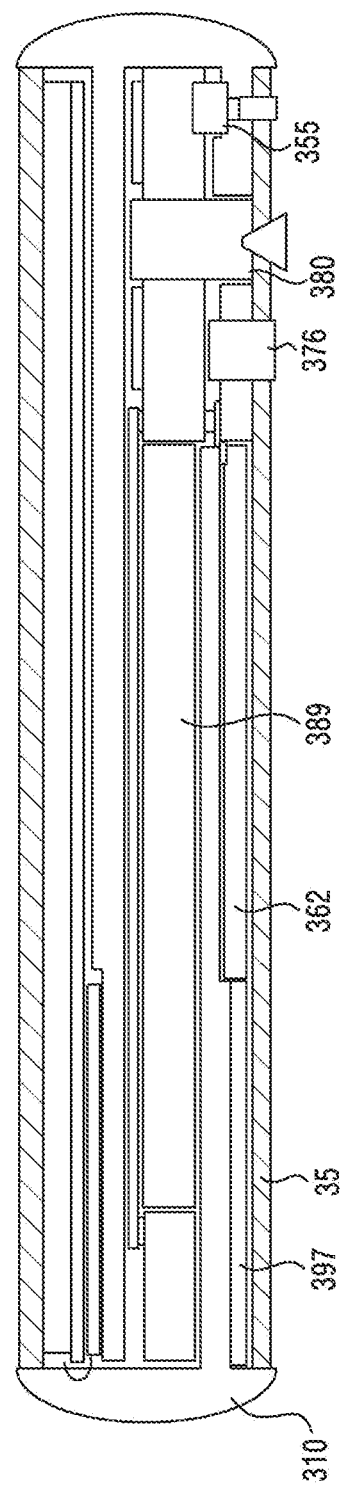
FIG. 3C is a sectional view illustrating an example method for mounting a short-distance wireless communication antenna of an electronic device according to another embodiment.

FIG. 3C is a sectional view illustrating an example method for mounting a short-distance wireless communication antenna of an electronic device according to another embodiment.

Referring to FIG. 3C, the electronic device according to another embodiment (for example, electronic device 101 or electronic devices 201, 202, and 203) may have a short-distance wireless communication antenna 397 disposed between a housing 310 and a second protective window 35. For example, if the second surface having no second display 362, no fingerprint sensor 376, no camera module 380, and no receiver 355 mounted thereon has a partial area large enough to mount a short-distance wireless communication antenna 397, the short-distance wireless communication antenna 397 may be disposed between the housing 310 and the second protective window 35. The second display 362 may be positioned on the lower end of the battery 389 and supported by the housing 310. The second display 362 is not positioned on the upper portion of the short-distance wireless communication antenna 397, and may be packaged by a metal housing.

Figure 3E:
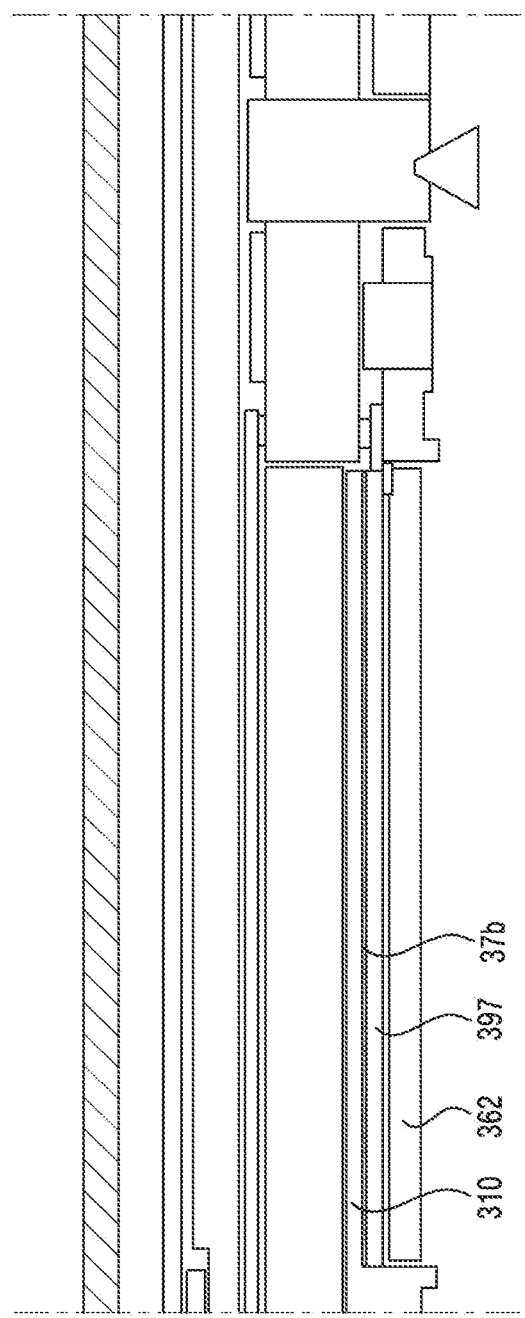
FIG. 3E is a sectional view illustrating an example method for mounting a short-distance wireless communication antenna of an electronic device according to another embodiment.

FIG. 3D is a sectional view illustrating an example method for mounting a short-distance wireless communication antenna of an electronic device according to another embodiment, and FIG. 3E is a sectional view illustrating an example method for mounting a short-distance wireless communication antenna of an electronic device according to another embodiment.

Referring to FIG. 3D and FIG. 3E, the electronic device according to another embodiment (for example, electronic device 101 or electronic devices 201, 202, and 203) may have a short-distance wireless communication antenna 397 disposed between a housing 310 and a second display 362. The housing 310 may include a nonmetallic material (for example, injection-molded material). A shielding structure (e.g., a shield) may be disposed between the short-distance wireless communication antenna 397 and the housing 310. The shielding structure may, for example, include a shielding sheet 37a as illustrated in FIG. 3D. shielding structure may, for example, include a shielding material 37b (for example, shielding paint) painted (or applied) to the housing 310, as illustrated in FIG. 3E. The short-distance wireless communication antenna 397 cannot transmit/receive radio signals through the first direction (first surface) due to the shielding sheet 37a or the shielding material 37b. However, since the second display 362 includes no metallic housing, the short-distance wireless communication antenna 397 is able to transmit/receive radio signals through the second direction (second surface).

Figure 3F:
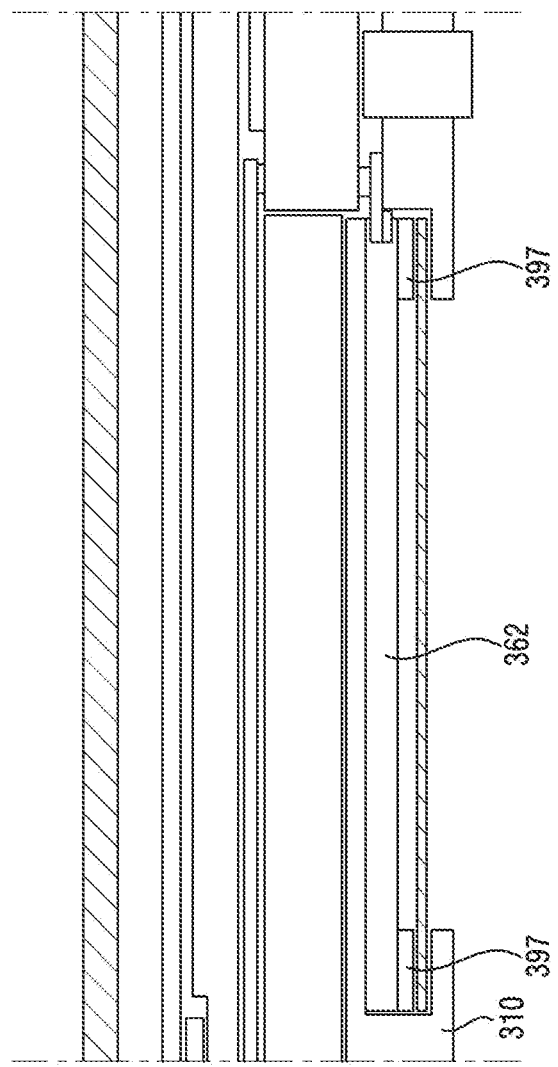
FIG. 3F is a sectional view illustrating an example method for mounting a short-distance wireless communication antenna of an electronic device according to another embodiment.

FIG. 3F is a sectional view illustrating an example method for mounting a short-distance wireless communication antenna of an electronic device according to another embodiment, and FIG. 3G is a diagram illustrating an example of the short-distance wireless communication antenna in FIG. 3F.

Referring to FIG. 3F and FIG. 3G, the electronic device according to another embodiment (for example, electronic device 101 or electronic devices 201, 202, and 203) may have a short-distance wireless communication antenna 397 disposed in a partial area (for example, bezel area) of the upper end of a second display 362. For example, the short-distance wireless communication antenna 397 may be a loop surrounding the bezel area of the second display 362, as illustrated in FIG. 3G. The structure in FIG. 3F and FIG. 3G may be used when the short-distance wireless communication antenna 397 cannot be disposed on the lower end of the second display 362 because the second display 362 is packaged by a metal housing.

Figure 3H:
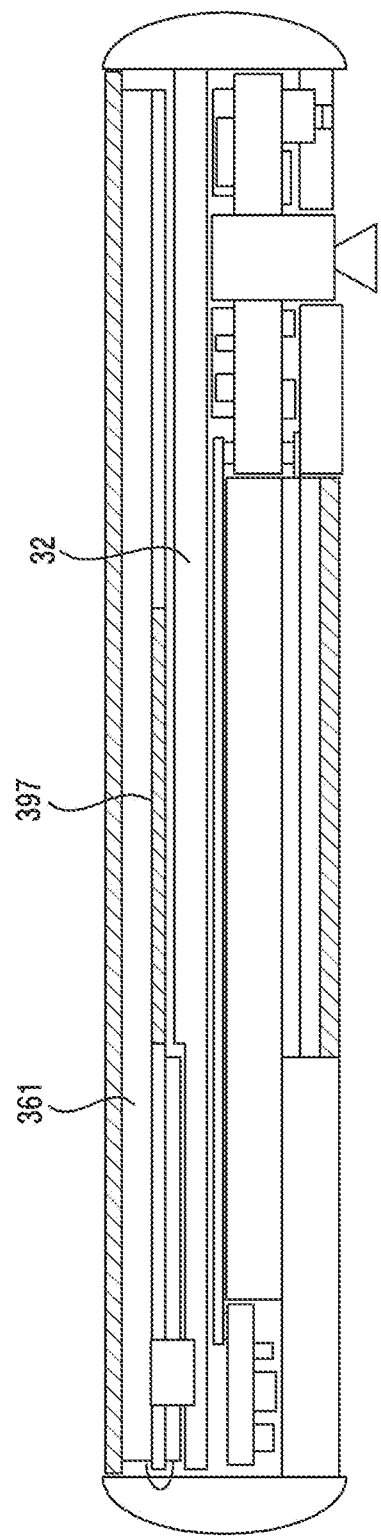
FIG. 3H is a sectional view illustrating an example method for mounting a short-distance wireless communication antenna of an electronic device according to another embodiment.

FIG. 3H is a sectional view illustrating an example method for mounting a short-distance wireless communication antenna of an electronic device according to another embodiment.

Referring to FIG. 3H, the electronic device according to another embodiment (for example, electronic device 101 or electronic devices 201, 202, and 203) may have a short-distance wireless communication antenna 397 disposed at the lower end of a first display 361. For example, the short-distance wireless communication antenna 397 may be disposed between the first display 361 and the bracket 32. The first display 361 may be a display (for example, OLED) not packaged by a metal housing. Since the first display 361 is not packaged by a metal housing, the short-distance wireless communication antenna 397 may transmit radio signals to the first direction (first surface) of the electronic device, or may receive radio signals from the first direction.

Figure 4:
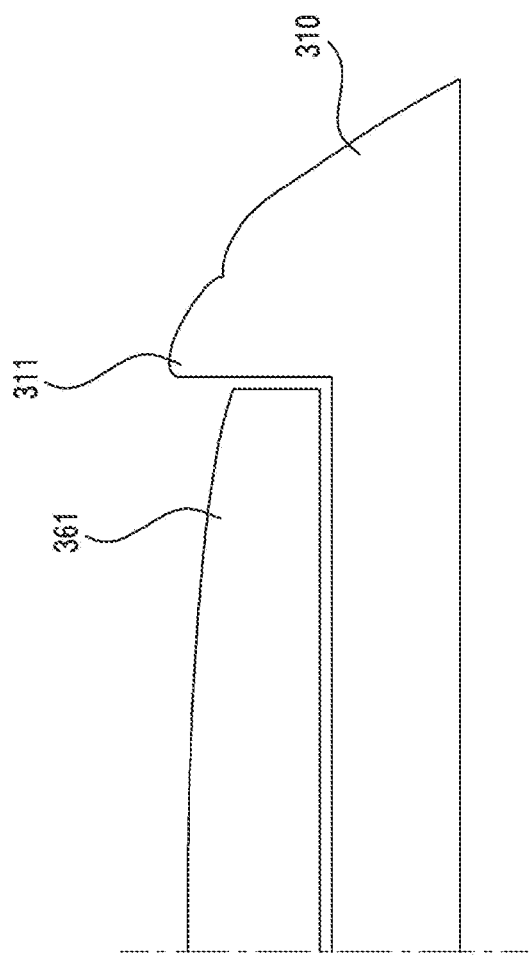
FIG. 4 is a diagram illustrating an example structure for protecting a first display of an electronic device according to an embodiment.

FIG. 4 is a diagram illustrating an example structure for protecting a first display of an electronic device according to an embodiment.

Referring to FIG. 4, the electronic device according to an embodiment (for example, electronic device 101 or electronic devices 201, 202, and 203) may include a structure for protecting the first display 361 from impacts. For example, a partial area 311 on the first surface of the housing 310 (hereinafter, referred to as first protrusion portion) may protrude higher than the surface of the first display 361. The first protrusion portion 311 may be provided on the left/right side surfaces of the first display 361. The first protrusion portion 311 may be provided on the upper/lower/left/right side surfaces thereof. The first display 361 may not contact the floor due to the at least one first protrusion portion 311. At least a part of the outer periphery of the first display 361 may have a curvature. This is for the purpose of preventing and/or reducing the outer peripheral portion, which is relatively vulnerable to impacts, from contacting the floor. In some embodiments, the first display 361 may be flat with no curvature.

Figure 5:
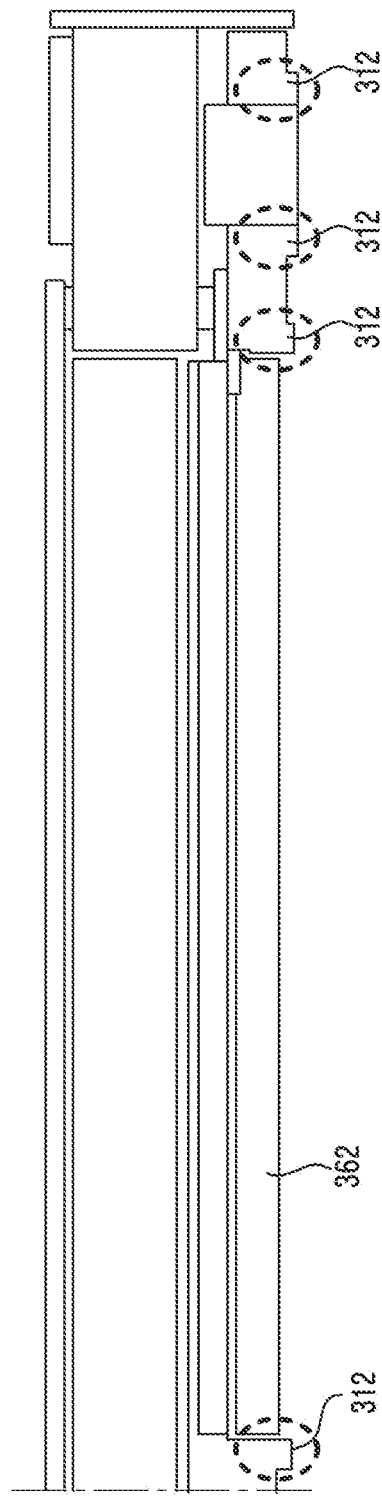
FIG. 5 is a diagram illustrating an example structure for protecting a second display of an electronic device according to an embodiment.

FIG. 5 is a diagram illustrating an example structure for protecting a second display of an electronic device according to an embodiment.

Referring to FIG. 5, the electronic device according to an embodiment (for example, electronic device 101 or electronic devices 201, 202, and 203) may include a structure for protecting the second display 362 from impacts. For example, a partial area 312 on the second surface of the housing 310 (hereinafter, referred to as second protrusion portion) may protrude higher than the surface of the second display 362. At least one second protrusion portion 312 may be formed on the periphery of the second display 362 or on the outer periphery of the second surface of the electronic device. The second display 362 may not contact the floor due to the at least one second protrusion portion 312.

Figure 6:
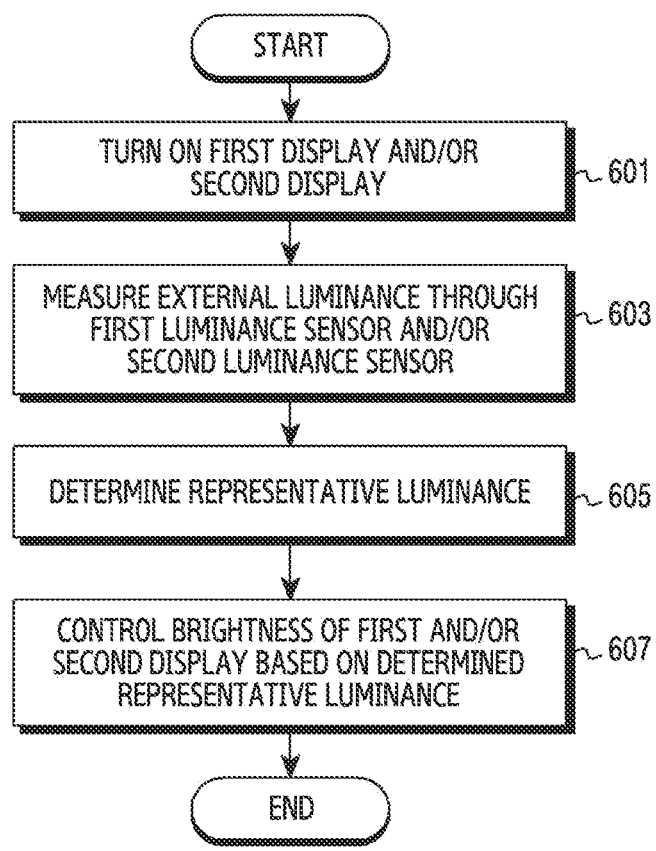
FIG. 6 is a flowchart illustrating an example method for adjusting the brightness of an electronic device according to an embodiment.

FIG. 6 is a flowchart illustrating an example method for adjusting the brightness of an electronic device according to an embodiment.

Referring to FIG. 6, the processor (for example, processor 120) of the electronic device according to an embodiment (for example, electronic device 101 or electronic devices 201, 202, and 203) may sense turning-on of the first display (for example, first display 261 or first display 361) and/or the second display (for example, second displays 262a, 262b, and 262c or second display 362) in operation 601. For example, the processor may turn on the first display and/or the second display in response to reception of a user input or an event (for example, a text message or a call).

The processor according to an embodiment may measure external luminance through the first luminance sensor (for example, first luminance sensor 211) and/or the second luminance sensor (for example, second luminance sensor 212) in operation 603. The first luminance sensor may be positioned on the first surface of the electronic device, and the second luminance sensor may be positioned on the second surface thereof. In some embodiments, the first luminance sensor may be positioned on a side surface of the electronic device.

The processor according to an embodiment may determine representative luminance in operation 605. For example, the processor may compare first luminance measured through the first luminance sensor and second luminance measured through the second luminance sensor, and may determine the higher value as the representative luminance. This is because one of the first and second luminance sensors may be covered by a hand or an external object. According to another example, the processor may determine the average value of the first luminance and the second luminance as the representative luminance. According to another example, the processor may determine the first luminance as the representative luminance when the first display faces upward, and may determine the second luminance as the representative luminance when the second display faces upward. According to another example, the processor may assign different weights to the first luminance and the second luminance, calculate the average value thereof, and may determine the calculated average value as the representative luminance. However, it will the understood that the various manners of determining the representative luminance are not limited to the above examples.

The processor according to an embodiment may control the brightness of the first display and/or the second display based on the determined representative luminance in operation 607. In some embodiments, if the first luminance sensor and the second luminance sensor are unavailable, the processor may measure external luminance using various sensors (for example, image sensor) capable of confirming the external luminance, and may determine the measured luminance as the representative luminance.

Figure 7:
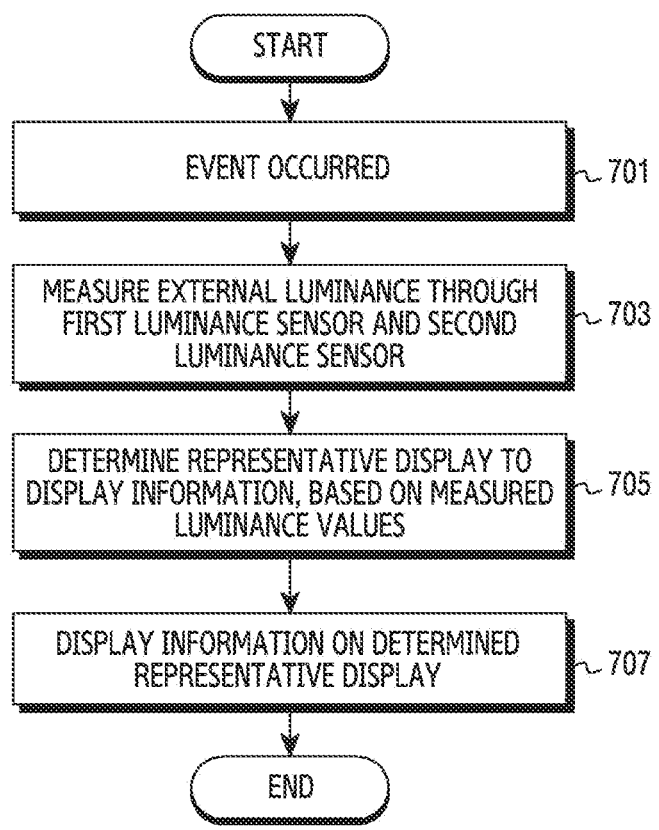
FIG. 7 is a flowchart illustrating an example method for providing information using a first display or a second display of an electronic device according to an embodiment.

FIG. 7 is a flowchart illustrating an example method for providing information using a first display and a second display of an electronic device according to an embodiment.

Referring to FIG. 7, the processor (for example, processor 120) of the electronic device according to an embodiment (for example, electronic device 101 or electronic devices 201, 202, and 203) may sense occurrence of an event in operation 701. The event may be an event that causes information to be provided (displayed) through the first display (for example, first display 261 or first display 361) or the second display (for example, second displays 262a, 262b, and 262c or second display 362).

The processor according to an embodiment may measure external luminance through the first luminance sensor (for example, first luminance sensor 211) and the second luminance sensor (for example, second luminance sensor 212) in operation 703.

The processor according to an embodiment may determine a representative display to provide (display) information based on the measured external luminance values in operation 705. An example method for determining the representative display will be described in greater detail below with reference to FIG. 8.

The processor according to an embodiment may control the electronic device to display information on the determined representative display in operation 707.

It has been assumed in the description with reference to FIG. 7 that first luminance and second luminance are measured when an event occurs, and the representative display to provide information is accordingly determined. In some embodiments, the processor may periodically measure first luminance and second luminance in a standby state, may determine the representative display to display information, and may display information through the previously determined representative display when an event occurs. However, it will be understood that measuring the first and second luminance is not limited to the above examples.

Figure 8:
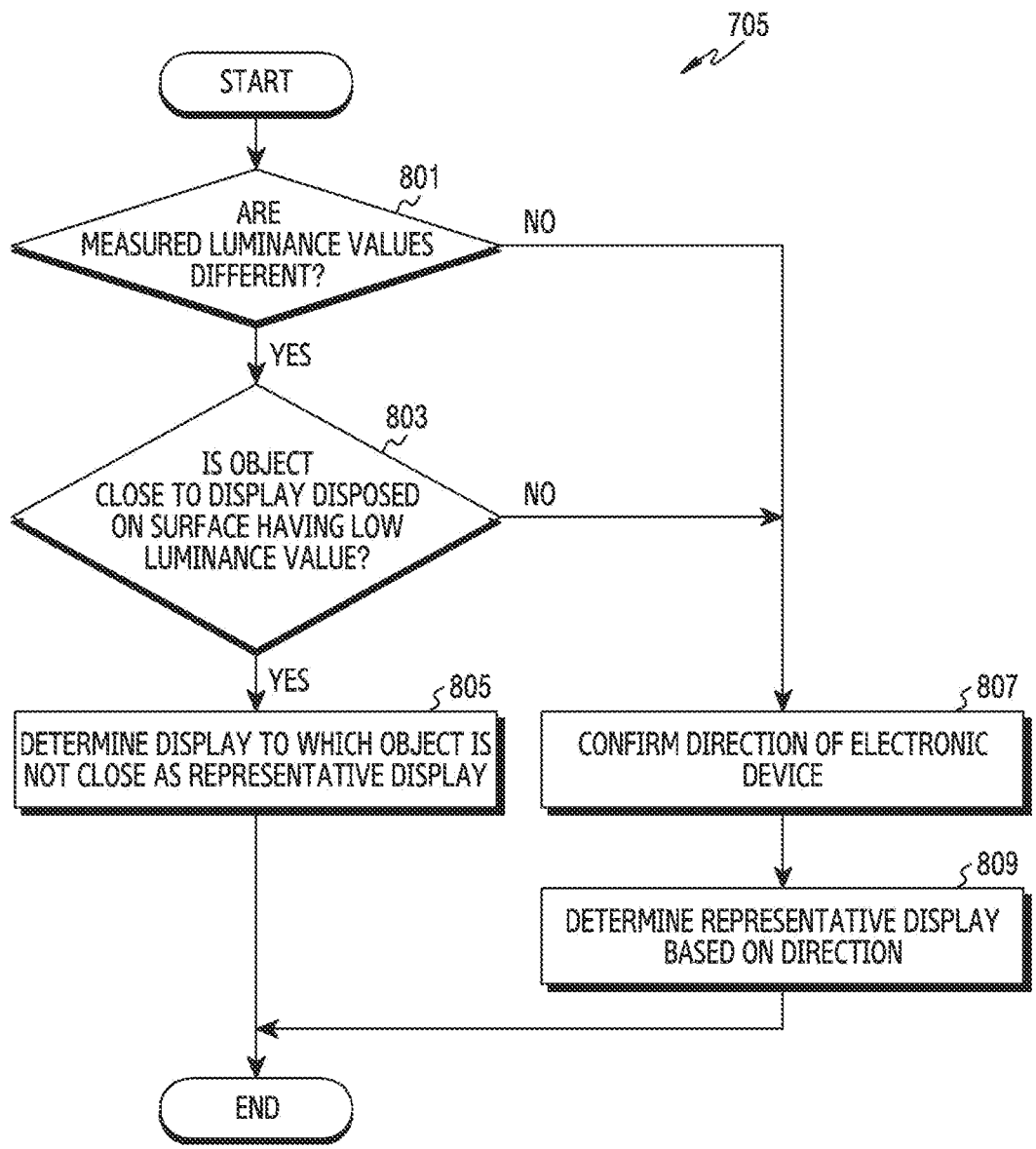
FIG. 8 is a flowchart illustrating an example method for determining a representative display to provide information by an electronic device according to an embodiment.

FIG. 8 is a flowchart illustrating an example method for determining a representative display to provide information by an electronic device according to an embodiment.

Referring to FIG. 8, the processor (for example, processor 120) of the electronic device according to an embodiment (for example, electronic device 101 or electronic devices 201, 202, and 203) may confirm whether or not measured luminance values are different in operation 801. In some embodiments, the processor may confirm whether or not the difference between the measured luminance values exceeds a designated reference value.

If it is confirmed in operation 801 that the luminance values are not different ("No" in operation 801), the processor may proceed to operation 807 (described later). If it is confirmed ("Yes") in operation 801 that the luminance values are different, the processor may confirm in operation 803 whether an object (for example, hand, floor, or the like) is close to the display disposed on the surface having a low luminance value (for example, first surface or second surface).

If it is confirmed in operation 803 that no object is close ("No" in operation 803), the processor may proceed to operation 807 (described later). If it is confirmed ("Yes") in operation 803 that an object is close, the processor may determine the display, to which the object is not close, as the representative display in operation 805. The processor according to an embodiment may confirm the direction of the electronic device in operation 807. For example, the processor may confirm the direction of the electronic device using an acceleration sensor, a six-axis sensor, or the like.

The processor according to an embodiment may determine the representative display based on the direction of the electronic device in operation 809. For example, the processor may determine the overlying display, among the first display and the second display, as the representative display based on the confirmed direction of the electronic device.

After determining the representative display, the processor may return to operation 707 in FIG. 7.

Figure 9A:
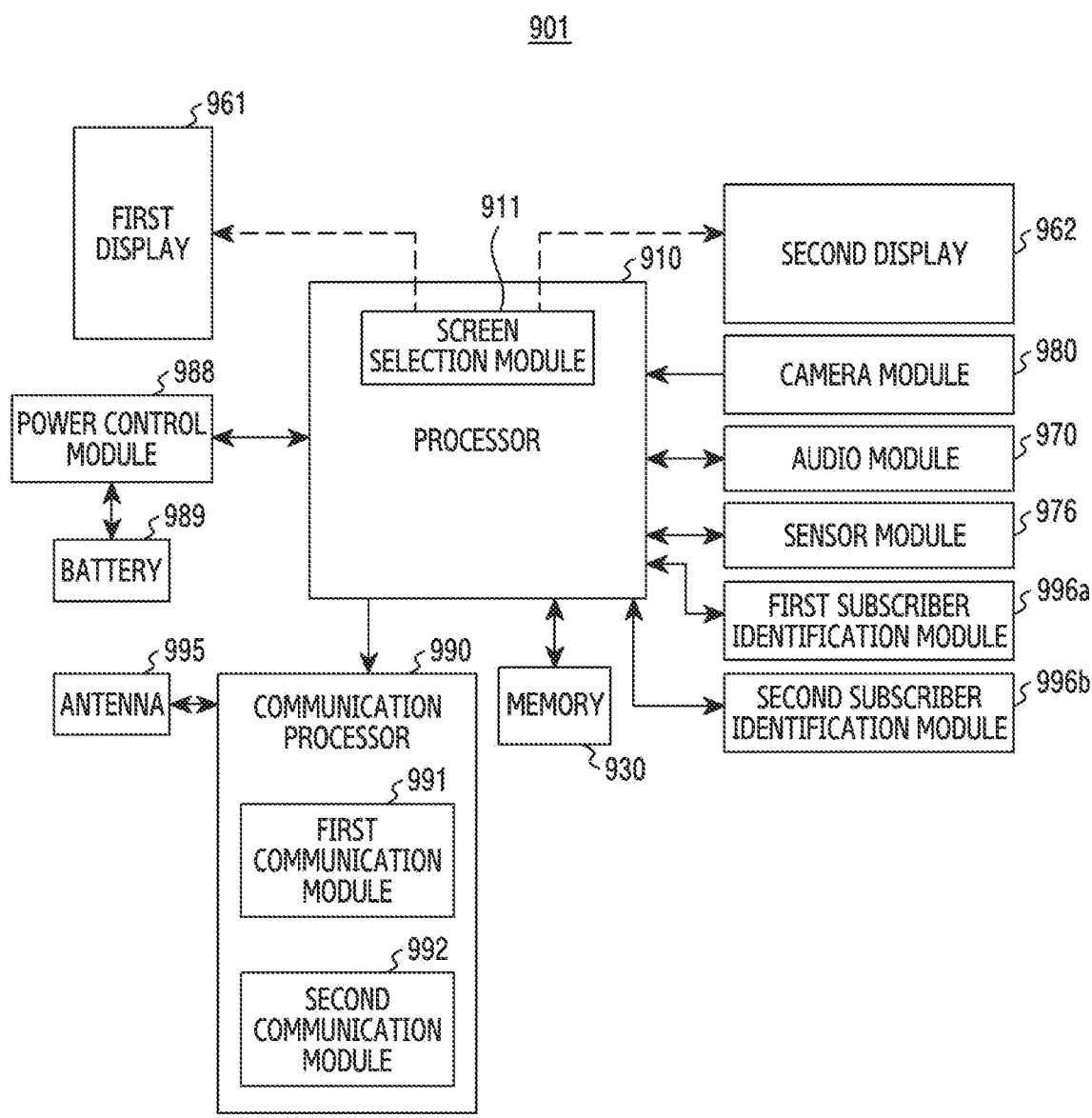
FIG. 9A is a block diagram illustrating an example electronic device according to an embodiment.

FIG. 9A is a block diagram illustrating an example electronic device according to an embodiment.

Referring to FIG. 9A, the electronic device 901 according to an embodiment (for example, electronic device 101 or electronic devices 201, 202, and 203) may include a power control module (e.g., including power control circuitry) 988, a battery 989, a memory 930, a camera module (e.g., including a camera) 980, an audio module (e.g., including audio circuitry) 970, a sensor module (e.g., including at least one sensor) 976, a first subscriber identification module 996a, a second subscriber identification module 996b, a communication processor (e.g., including communication and/or processing circuitry) 990, an antenna 995, a first display 961, a second display 962, and a processor (e.g., including processing circuitry) 910.

The power control module 988, the battery 989, and the memory 930 according to an embodiment are configured the same as or similarly to the power management module 188, the battery 189, and the memory 130 in FIG. 1, and detailed descriptions thereof will not be repeated here.

The audio module 970 (for example, audio module 170) may include various audio circuitry and convert a sound to an electric signal or may convert an electric signal to a sound. The audio module 970 according to an embodiment may output a speech sound through the receiver (not illustrated) (for example, receiver 255) disposed on the second surface (rear surface) of the electronic device 901 during a call.

The sensor module 976 (for example, sensor module 176) may include various sensors for sensing the state of the electronic device or the state of the external environment. For example, the sensor module 976 may include, for example, and without limitation, a sensor for confirming the direction of the electronic device (for example, acceleration sensor, gravity sensor, six-axis sensor, or the like), a sensor for user authentication (for example, iris sensor, fingerprint sensor, or the like), a sensor for measuring external luminance (for example, luminance sensor), or the like. The sensor module 976 may include a first luminance sensor disposed on the first surface of the electronic device 901 and a second luminance sensor disposed on the second surface thereof. In some embodiments, the first luminance sensor may be omitted or disposed on a side surface of the electronic device.

A part of the sensor module 976 may be disposed on the second surface. For example, and without limitation, a proximity sensor normally disposed on the first surface of the electronic device may be disposed on the second surface.

The first subscriber identification module 996a (for example, subscriber identification module 196) may store first subscriber information (for example, IMSI). The second subscriber identification module 996b (for example, subscriber identification module 196) may store second subscriber information (for example, IMSI). The first subscriber identification module 996a and the second subscriber identification module 996b may interwork with the first display 961 and the second display 962, respectively. The first subscriber identification module 996a and the second subscriber identification module 996b may be subscriber identification modules of different nations or subscriber identification modules of different users.

The communication processor 990 may include various communication and/or processing circuitry and establish a communication channel with an external electronic device (for example, electronic device 102, electronic device 104, or server 108) and may support communication through the establish communication channel. The communication processor 990 may include a first communication module (e.g., including communication circuitry) 991 and a second communication module (e.g., including communication circuitry) 992. The first communication module 991 may support communication in a first frequency band (for example, and without limitation, 2G/3G/4G), and the second communication module 992 may support communication in a second frequency band (for example, and without limitation, 5G).

The antenna 995 may be connected to the first communication module 991 and the second communication module 992 so as to transmit/receive radio signals in frequency bands supported by the first communication module 991 and the second communication module 992. In some embodiments, the antenna 995 may include multiple antennas according to the frequency band.

The first display 961 may be positioned at the first surface (front surface) of the electronic device 901. The first display 961 may occupy substantially all (e.g., 95% or more) of the area of the first surface. The first display 961 may, for example, and without limitation, be a flat, edge, curved, or flexible display.

The second display 962 may be positioned at the second surface (rear surface) of the electronic device 901. The second display 962 may occupy a partial area of the second surface (for example, at least a part of the area other than the area occupied by the receiver, the camera, the sensor, and the like). The second display 962 may have a size smaller than a size of the first display 961. The second display 962 may have a resolution identical to or different from that of the first display 961.

The processor 910 according to an embodiment may include various processing circuitry and may have a physical channel for providing data for screen display to the displays. For example, the processor 910 may provide various kinds of information through the first display 961 or the second display 962. The processor 910 may include a screen selection module (e.g., including screen selection circuitry and/or executable program elements) 911.

The screen selection module 911 may include various screen selection circuitry and/or various executable program elements and select one from the first display 961 and the second display 962 as the representative display, as described with reference to FIG. 8, and may provide information to the selected representative display. For example, if a call request is received while using contents through the first display 961 (for example, web browser, moving image playback), the screen selection module 911 may transmit a screen corresponding to call reception to the first display 961. If call reception is allowed, or upon sensing a direction change of the electronic device such that the user views the second surface of the electronic device, the screen selection module 911 may transmit a screen for call making to the second display 962. As another example, if an event related to the first subscriber identification module 996a occurs, the screen selection module 911 may provide a screen corresponding to the event to the display (for example, first display 961) configured to interwork with the first subscriber identification module 996a. Similarly, if an event related to the second subscriber identification module 996b occurs, the screen selection module 911 may provide a screen corresponding to the event to the display (for example, second display 962) configured to interwork with the second subscriber identification module 996b.

Figure 9B:
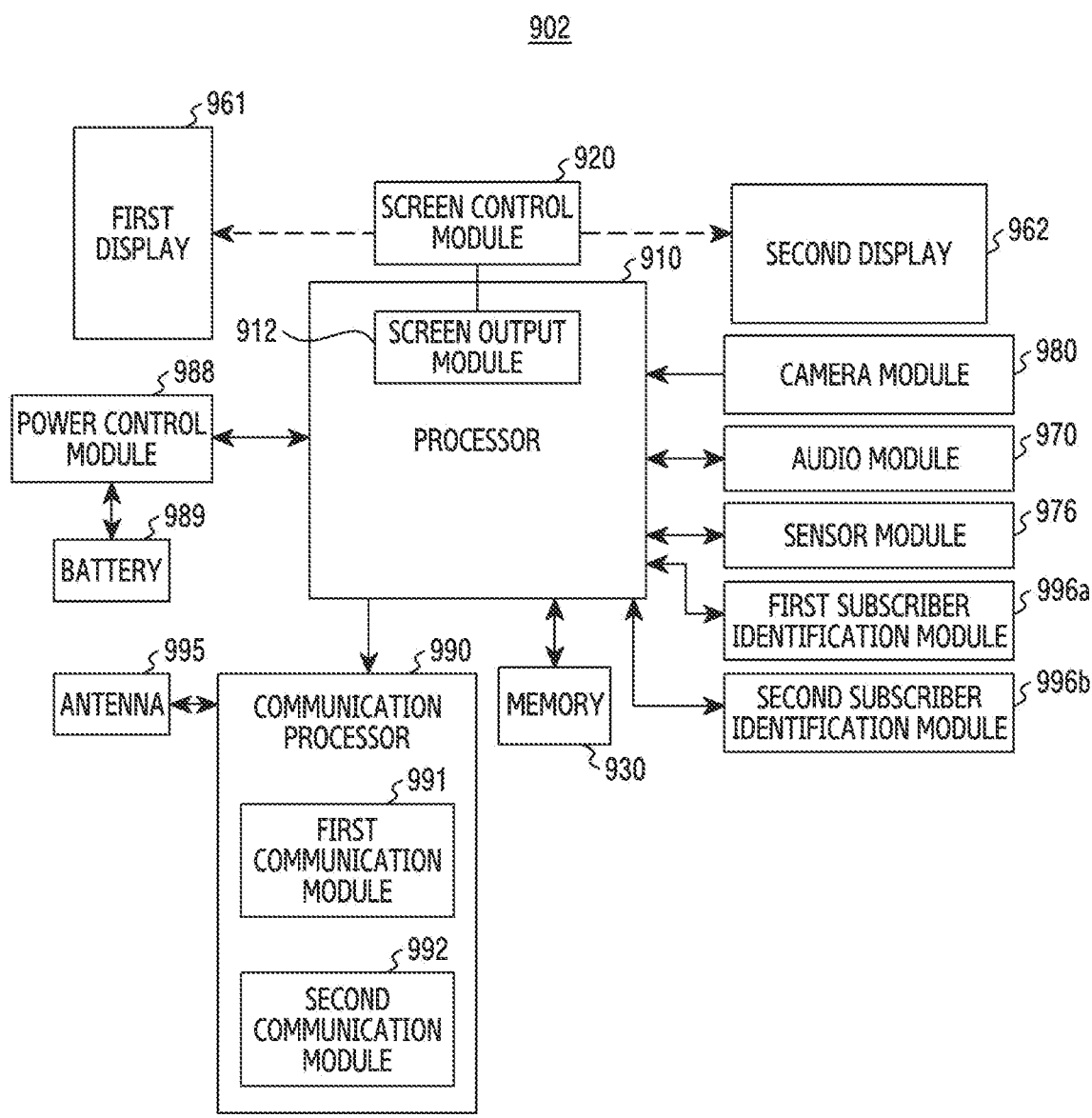
FIG. 9B is a block diagram illustrating an example electronic device according to another embodiment.

FIG. 9B is a block diagram illustrating an example electronic device according to another embodiment.

Referring to FIG. 9B, the electronic device 902 according to an embodiment (for example, electronic device 101 or electronic devices 201, 202, and 203) may include a power control module (e.g., including power control circuitry) 988, a battery 989, a memory 930, a camera module (e.g., including a camera) 980, an audio module (e.g., including audio circuitry) 970, a sensor module (e.g., including at least one sensor) 976, a first subscriber identification module 996a, a second subscriber identification module 996b, a communication processor (e.g., including communication and/or processing circuitry) 990, an antenna 95, a first display 961, a second display 962, a processor (e.g., including processing circuitry) 910, and a screen control module (e.g., including screen control circuitry) 920.

Prior to detailed descriptions, repeated descriptions of the same elements of the electronic device 902 in FIG. 9B as those of the electronic device 901 in FIG. 9A will not be repeated here.

The processor 910 according to an embodiment may include various processing circuitry and provide various kinds of information through at least one of the first display 961 or the second display 962. The processor 910 may include a screen output module 912.

The screen output module 912 may include various screen output circuitry and/or executable program elements and transmit screen data corresponding to a screen to be outputted to the first display 961 and/or the second display 962, and selected display information, to the screen control module 920.

The screen control module 920 may include various screen control circuitry and may include, for example, and without limitation a switching module (e.g., including a switch). The screen control module 920 may be switched such that, based on the selected display information, screen data transmitted from the screen output module 912 is transmitted to the selected display. In some embodiments, if the first display 961 and the second display 962 have the same resolution, the screen control module 920 may operate such that screen data is transmitted both to the first display 961 and to the second display 962.

Figure 9C:
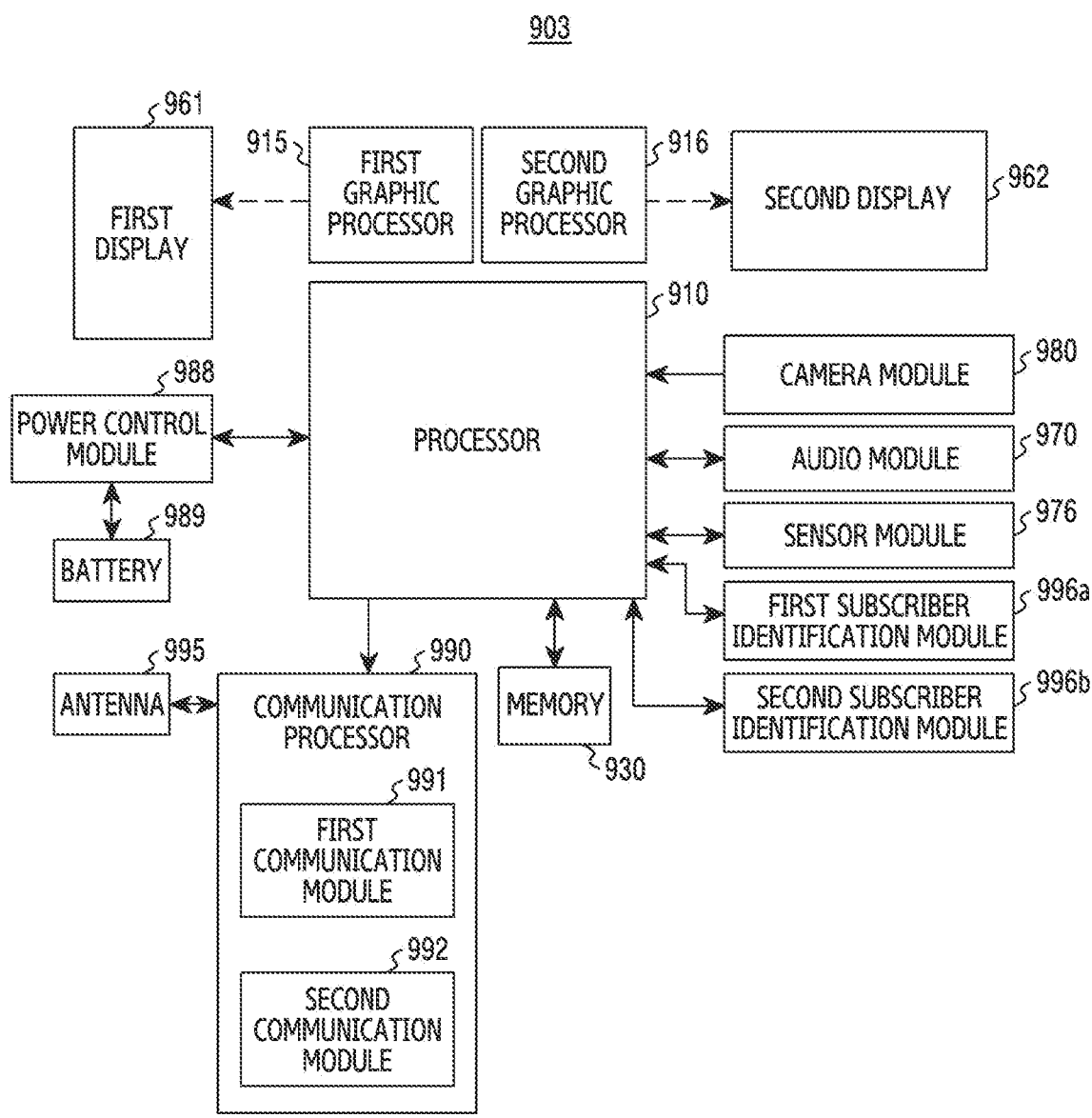
FIG. 9C is a block diagram illustrating an example electronic device according to still another embodiment.

FIG. 9C is a block diagram illustrating an example electronic device according to still another embodiment.

Referring to FIG. 9C, the electronic device 903 according to an embodiment (for example, electronic device 101 or electronic devices 201, 202, and 203) may include a power control module (e.g., including power control circuitry) 988, a battery 989, a memory 930, a camera module (e.g., including a camera) 980, an audio module (e.g., including audio circuitry) 970, a sensor module (e.g., including at least one sensor) 976, a first subscriber identification module 996a, a second subscriber identification module 996b, a communication processor (e.g., including communication and/or processing circuitry) 990, an antenna 995, a first display 961, a second display 962, a processor (e.g., including processing circuitry) 910, a first graphic processor (e.g., including graphic processing circuitry) 915, and a second graphic processor (e.g., including graphic processing circuitry) 916.

Prior to detailed descriptions, repeated descriptions of the same elements of the electronic device 903 in FIG. 9C as those of the electronic devices 901 and 902 in FIG. 9A and FIG. 9B will not be repeated here.

The electronic device 903 according to an embodiment may include a first graphic processor 915 including various graphic processing circuitry for controlling the first display 961 and a second graphic processor 916 including various graphic processing circuitry for controlling the second display 962. As a result, the processor 910 may separately control the first display 961 and the second display 962. For example, the processor 910 may control the first graphic processor 915 and the second graphic processor 916 so as to display a screen on one of the first display 961 or the second display 962 or to simultaneously display identical or different screens on the first display 961 and the second display 962. For example, the processor 910 may provide a message composition screen through the first display 961 and may play a moving image through the second display 962.

The electronic device 903 according to an embodiment can separately control the first display 961 and the second display 962 such that different screens for respective business providers or nations may be separately provided on the first display 961 or the second display 962. For example, a screen related to the first subscriber identification module 996a may be provided on the first display 961, and a screen related to the second subscriber identification module 996b may be provided on the second display 962.

Figure 10:
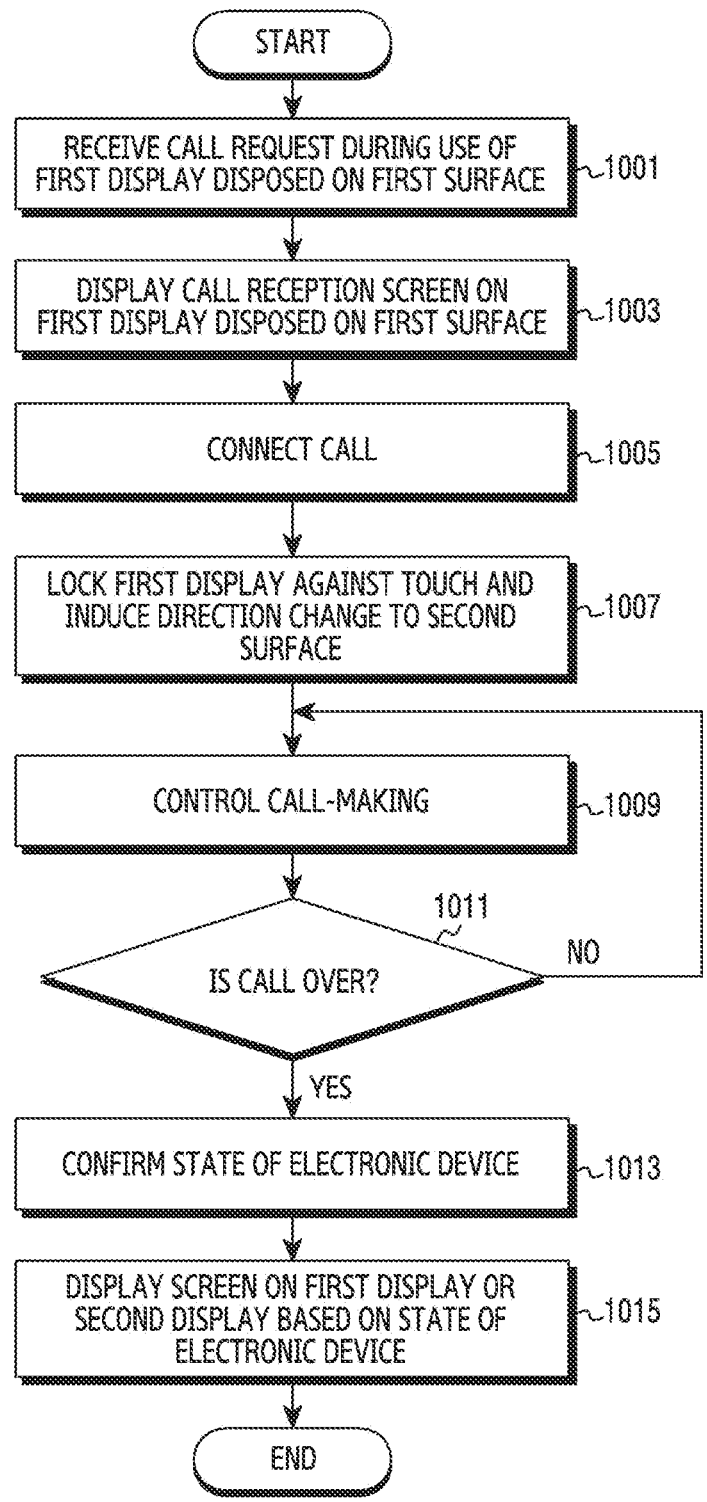
FIG. 10 is a flowchart illustrating an example method for making a call by an electronic device according to an embodiment.

FIG. 10 is a flowchart illustrating an example method for making a call by an electronic device according to an embodiment.

Referring to FIG. 10, the processor (for example, processor 120 or processor 910) of the electronic device according to an embodiment (for example, electronic device 101, electronic devices 201, 202, and 203, or electronic devices 901, 902, and 903) may receive a call request during use of the first display (for example, first display 261, first display 361, or first display 961) disposed on the first surface in operation 1001.

The processor according to an embodiment may display a call reception screen on the first display in operation 1003. For example, the processor may display caller information and an item for accepting or rejecting the call on the first display.

The processor according to an embodiment may sense or establish call connection (e.g., connect call) in operation 1005. For example, the processor may sense a touch (or dragging) on the call accepting item.

The processor according to an embodiment may lock the first display against touches and may induce a direction change to the second surface in operation 1007. For example, the processor may display a popup message on the first display so as to indicate that a direction change to the second surface is necessary.

In some embodiments, upon receiving a call request in operation 1001, the processor may omit operations 1003 and 1005 and may perform operation 1007. In response to sensing a direction change of the electronic device, the processor may display a user interface (UI) on the second display (for example, second displays 262a, 262b, and 262c, second display 362, or second display 962) disposed on the second surface so as to ask whether or not to accept the call, and may determine whether or not to connect the call based on a user input sensed through the UI. In another example, upon receiving a call request in operation 1001, the processor may perform operation 1007 and, in response to sensing a direction change of the electronic device, may control the call to be made automatically through the receiver disposed on the second surface. As such, an embodiment may use the direction change of the electronic device as a trigger to accept the call, but the disclosure is not limited thereto.

The processor according to an embodiment may control a call-making procedure in operation 1009. For example, the processor may turn off the second display if the second display approaches the user's face.

The processor according to an embodiment may confirm whether the call is over in operation 1011. If it is confirmed in operation 1011 that the call is not over ("No" in operation 1011), the processor may return to operation 1009. If it is confirmed ("Yes") in operation 1011 that the call is over, the processor may confirm the state of the electronic device in operation 1013. For example, the processor may confirm which of the first display and the second display is facing upward using at least one of various sensors (for example, first luminance sensor, second luminance sensor, acceleration sensor, six-axis sensor, and the like).

The processor according to an embodiment may display a screen on the first display or the second display based on the state of the electronic device in operation 1015.

Figure 11:
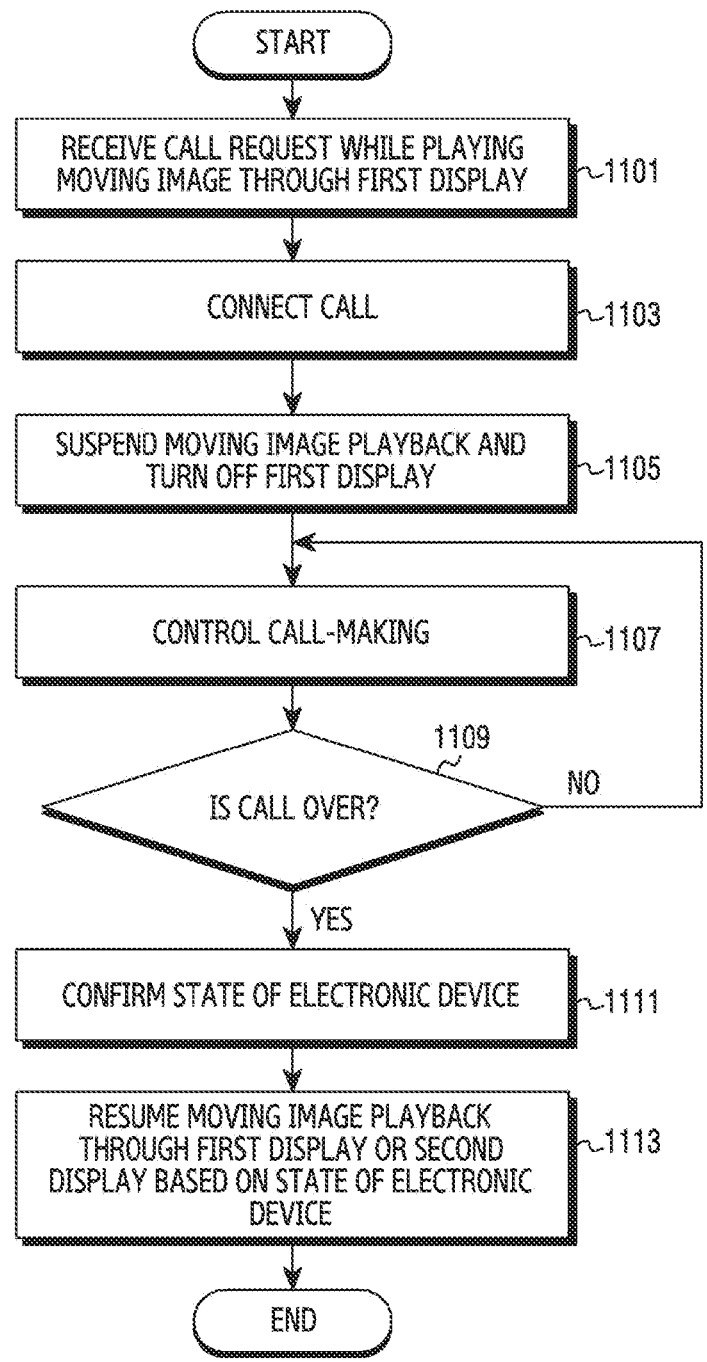
FIG. 11 is a flowchart illustrating an example method for making a call while playing a moving image by an electronic device according to an embodiment.

FIG. 11 is a flowchart illustrating an example method for making a call while playing a moving image by an electronic device according to an embodiment.

Referring to FIG. 11, the processor (for example, processor 120 or processor 910) of the electronic device according to an embodiment (for example, electronic device 101, electronic devices 201, 202, and 203, or electronic devices 901, 902, and 903) may receive a call request while playing a moving image through the first display (for example, first display 261, first display 361, or first display 961) disposed on the first surface in operation 1101.

The processor according to an embodiment may sense or establish call connection (e.g., connect call) in operation 1103. The processor according to an embodiment may suspend the moving image playback and may turn off the first display in operation 1105. In some embodiments, the processor may output a message on the first display to induce a direction change to the second surface when sensing call connection, and may turn off the first display when sensing completion of the direction change to the second surface.

In some embodiments, upon receiving a call request in operation 1101, the processor may omit operation 1103 and may perform operation 1105. In response to sensing a direction change of the electronic device, the processor may display a user interface (UI) on the second display (for example, second displays 262a, 262b, and 262c, second display 362, or second display 962) disposed on the second surface to ask whether or not to accept the call, and may determine whether or not to connect the call based on a user input sensed through the UI. In another example, upon receiving a call request in operation 1101, the processor may perform operation 1105 and, in response to sensing a direction change of the electronic device, may control the call to be made automatically through the receiver disposed on the second surface. As such, an embodiment may use the direction change of the electronic device as a trigger to accept the call.

The processor according to an embodiment may control a call-making procedure in operation 1107. For example, the processor may turn off the second display if the second display approaches the user's face.

The processor according to an embodiment may confirm whether the call is over in operation 1109. If it is confirmed in operation 1109 that the call is not over ("No" in operation 1109), the processor may return to operation 1107. If it is confirmed ("Yes") in operation 1109 that the call is over, the processor may confirm the state of the electronic device in operation 1111. For example, the processor may confirm which of the first display and the second display is facing upward using at least one of various sensors (for example, first luminance sensor, second luminance sensor, acceleration sensor, six-axis sensor, and the like).

The processor according to an embodiment may resume the moving image playback through the first display or the second display based on the state of the electronic device in operation 1113. For example, the processor may resume the moving image playback through the second display if the second display faces upward after the call is over. In some embodiments, the processor may output a popup window on the second display so as to ask whether or not to resume the moving image playback, and may determine whether or not to resume the moving image playback through the second display according to the user's selection.

Figure 12:
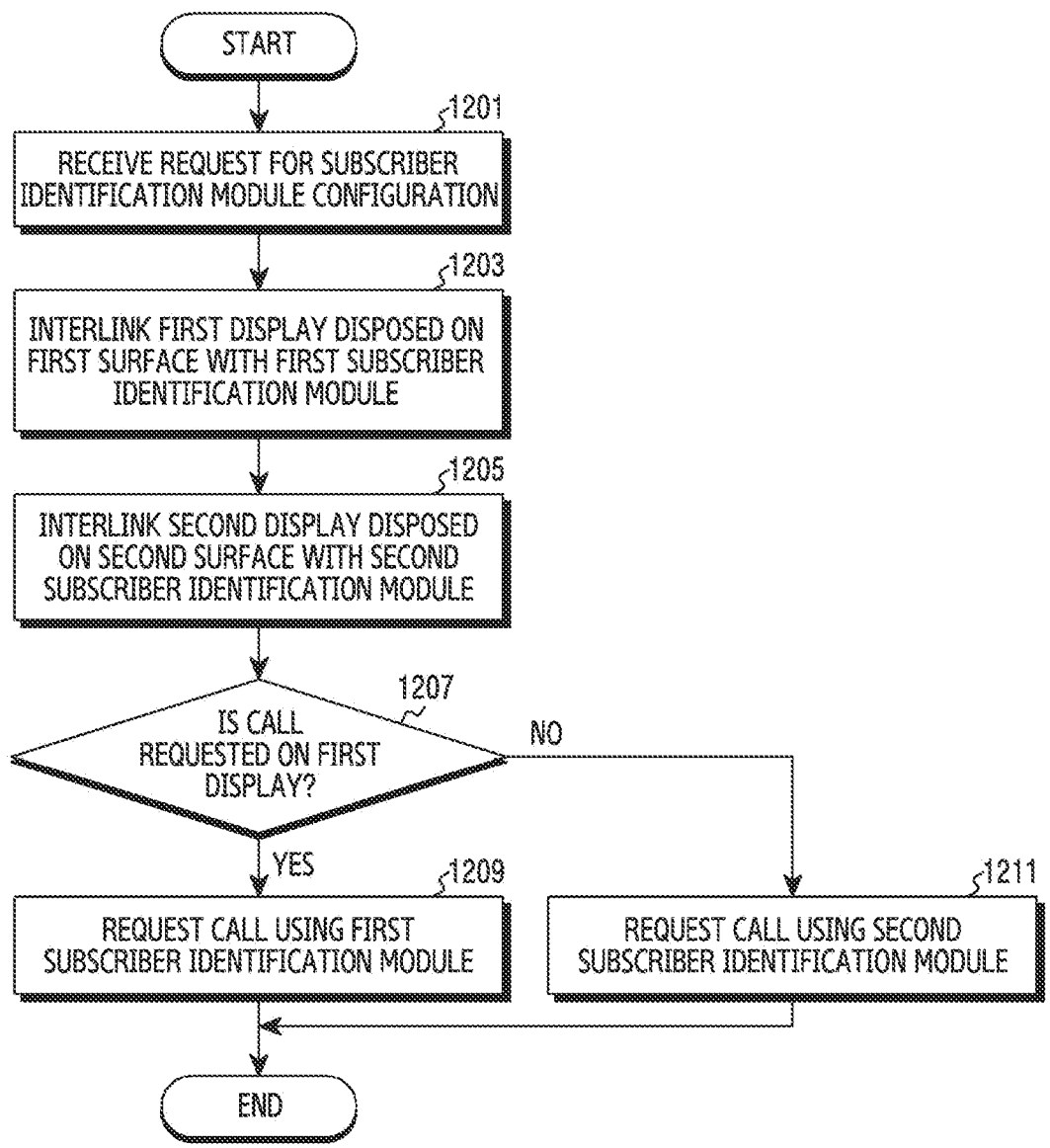
FIG. 12 is a flowchart illustrating an example method for operating a subscriber identification module of an electronic device according to an embodiment.

FIG. 12 is a flowchart illustrating an example method for operating a subscriber identification module of an electronic device according to an embodiment.

Referring to FIG. 12, the processor (for example, processor 120 or processor 910) of the electronic device according to an embodiment (for example, electronic device 101, electronic devices 201, 202, and 203, or electronic devices 901, 902, and 903) may receive a request for configuring a subscriber identification module in operation 1201.

The processor according to an embodiment may interlink the first display (for example, first display 261, first display 361, or first display 961) disposed on the first surface with the first subscriber identification module (for example, first subscriber identification module 996a) in operation 1203. For example, the processor may display information regarding multiple subscriber identification modules mounted on the electronic device, and may interlink the first subscriber identification module selected by the user with the first display.

The processor according to an embodiment may interlink the second display (for example, second displays 262a, 262b, and 262c, second display 362, or second display 962) disposed on the second surface with the second subscriber identification module (for example, second subscriber identification module 996b) in operation 1205. For example, the processor may display information regarding multiple subscriber identification modules mounted on the electronic device, and may interlink the second subscriber identification module selected by the user with the second display.

The processor according to an embodiment may confirm whether or not there is a call request on the first display in operation 1207. If it is confirmed ("Yes") in operation 1207 that there is a request for a call (for example, outgoing call) on the first display, the processor may request a call using the first subscriber identification module in operation 1209. If it is confirmed in operation 1207 that there is no request for a call on the first display (there is a call request on the second display), the processor may request a call using the second subscriber identification module in operation 1211.

Figure 13:
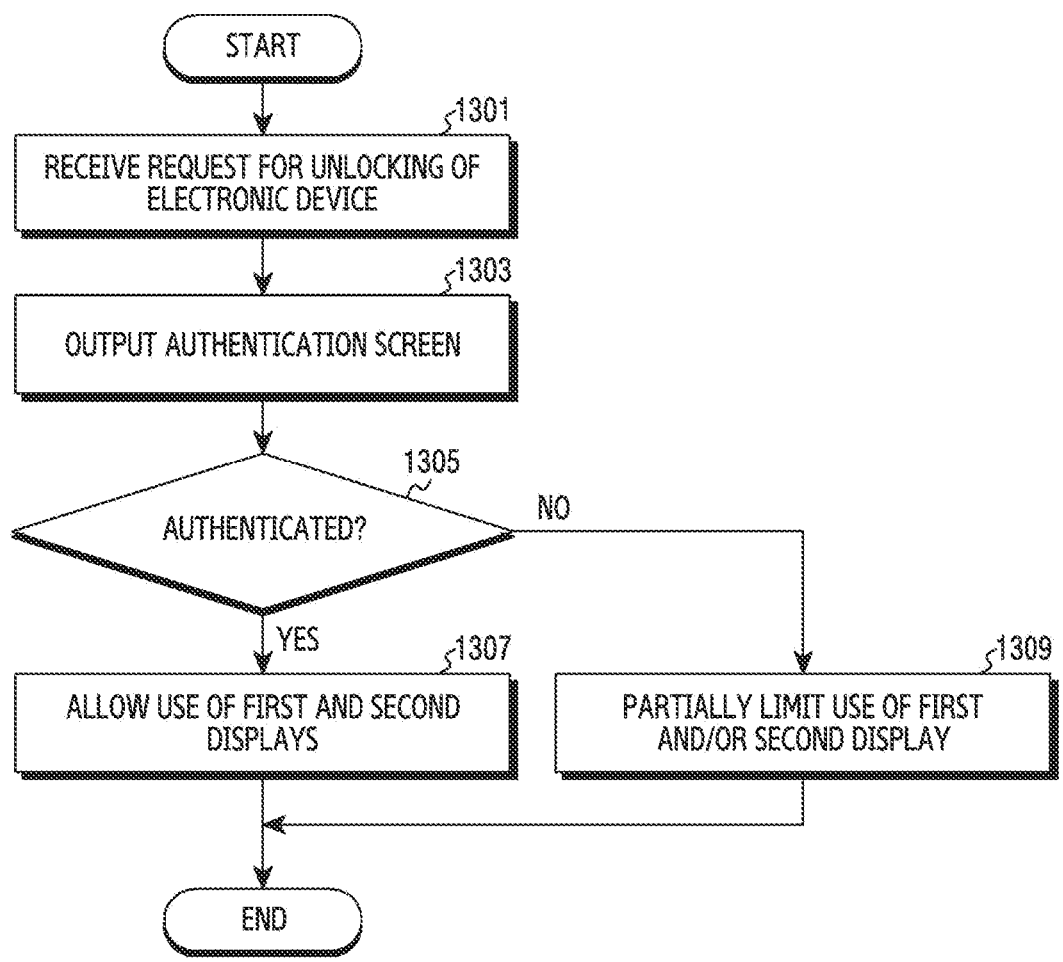
FIG. 13 is a flowchart illustrating an example method for controlling the use of a display through authentication of an electronic device according to an embodiment.

FIG. 13 is a flowchart illustrating an example method for controlling the use of a display through authentication by an electronic device according to an embodiment.

Referring to FIG. 13, the processor (for example, processor 120 or processor 910) of the electronic device according to an embodiment (for example, electronic device 101, electronic devices 201, 202, and 203, or electronic devices 901, 902, and 903) may receive a request for unlocking the electronic device in operation 1301.

The processor according to an embodiment may output an authentication screen in operation 1303. For example, the processor may output an authentication screen on the first display (for example, first display 261, first display 361, or first display 961) or on the second display (for example, second displays 262a, 262b, and 262c, second display 362, or second display 962).

The processor according to an embodiment may confirm whether or not authentication is successful in operation 1305. For example, the processor may confirm whether or not authentication is successful using biometric information (for example, fingerprint, iris, face, or the like).

If it is confirmed in operation 1305 that authentication is successful, the processor may allow use of the first display and the second display in operation 1307. If it is confirmed in operation 1305 that authentication is not successful, the processor may partially limit use of the first display and/or the second display in operation 1309. For example, the processor may allow use of the first display or the second display alone, or may limit/prevent and/or reduce display of personal information.

According to various example embodiments of the present disclosure, an electronic device (e.g., the electronic device 101, 201, 202, 203, 901, 902. 903) may comprise: a housing (e.g., the housing 210, 310) comprising a first surface facing a first direction and a second surface facing a second direction opposite the first direction; a first display (e.g., the first display 261, 361, 961) viewable through the first surface; a battery (e.g., the battery 189, 389, 989) disposed between the first display and the second surface; a second display (e.g., the second display 262a, 262b, 262c, 362, 962) having a size smaller than a size of the first display and viewable through a partial area of the second surface; a short-distance wireless communication antenna (e.g., the antenna module 197, the short-distance wireless communication antenna 397, the antenna 995) disposed at a lower end of the second display and configured to transmit/receive a short-distance wireless communication signal through the partial area of the second surface and the second display; and a shield (e.g., the shielding sheet 37a, the shielding material 37b) disposed at a lower end of the short-distance wireless communication antenna and configured to substantially block transmission/reception of the short-distance wireless communication signal through the first surface.

According to various example embodiments, the second display may include an organic light-emitting diode (OLED) display.

According to various example embodiments, the electronic device may further comprise a support (e.g., the support 33) disposed between the battery and the shield to support the second display.

According to various example embodiments, the shield may comprise a shielding sheet or shielding paint.

According to various example embodiments, the electronic device may further comprise a bracket (e.g., the bracket 32) supporting the first display.

According to various example embodiments, the housing may include at least one of: at least one first protrusion portion (e.g., the first protrusion portion 311) protruding from the first surface to be higher than a surface of the first display; and/or at least one second protrusion portion (e.g., the second protrusion portion 312) protruding from the second surface to be higher than a surface of the second display.

According to various example embodiments, the electronic device may further comprise: at least one electronic component comprising circuitry (e.g., the receiver 255, the camera module 280, the flash 281, the fingerprint sensor 276) exposed through a different area of the second surface; a first luminance sensor (e.g., the first luminance sensor 211) disposed at the first surface; and a second luminance sensor (e.g., the second luminance sensor 212) disposed at the second surface.

According to various example embodiments, the electronic device may further comprise: at least one processor (e.g., the processor 12, 910) operatively connected to the first display, the second display, the at least one electronic component, the first luminance sensor, and the second luminance sensor; and a memory (e.g., the memory 130, 930) operatively connected to the processor, wherein the memory is configured to store instructions that, when executed, cause the at least one processor to control the electronic device to: measure external luminance using at least one of the first luminance sensor and the second luminance sensor; and control brightness of at least one of the first display and the second display, based on the measured external luminance.

According to various example embodiments, the instructions may, when executed, cause the at least one processor to determine a representative display to display information, based on at least one of luminance values measured through the first luminance sensor and the second luminance sensor, in response to occurrence of an event for information display.

According to various example embodiments, the instructions may, when executed, cause the at least one processor to: confirm, based on the luminance values measured through the first luminance sensor and the second luminance sensor being different, whether an object is within a specified proximity of the display disposed on the surface having the lower luminance value; and determine, based on the object being within the specified proximity of the display disposed on the surface having the lower luminance value, another display as the representative display.

According to various example embodiments, the instructions may, when executed, cause the at least one processor to control the electronic device to: notify that a direction change of the electronic device is necessary to cause the second display to be used in response to an incoming or outgoing call on the first display, lock the first display in response to sensing the direction change, and make a call automatically through a receiver disposed on the second surface, or lock the first display in response to sensing the direction change, display a user interface (UI) on the second display configured to ask whether to accept the call, and make the call based on an input sensed through the UI.

According to various example embodiments, the instructions may, when executed, cause the at least one processor to: confirm the direction of the electronic device based on the call being over; and determine a display to display a previous screen, based on the confirmed direction of the electronic device.

According to various example embodiments, the electronic device may further comprise: a first subscriber identification module (e.g., the first subscriber identification module 996a) configured to be associated with the first display; and a second subscriber identification module (the second subscriber identification module 996b) configured to be associated with the second display, wherein the instructions, when executed, cause the at least one processor to control the electronic device to: provide a screen related to the first subscriber identification module on the first display; and provide a screen related to the second subscriber identification module on the second display.

According to various example embodiments, the instructions may, when executed, cause the at least one processor to control the electronic device to request a call using the first subscriber identification module based on a call request being sensed on the first display.

According to various example embodiments, the instructions may, when executed, cause the at least one processor to control the electronic device to: request a call using the second subscriber identification module based on a call request being sensed on the second display.

According to various example embodiments, the instructions may, when executed, cause the at least one processor to control the electronic device to: request authentication based on the electronic device being unlocked; and limit use regarding at least one of the first display and the second display, based on whether authentication is successful.

According to various example embodiments, the at least one processor may comprise: an application processor (e.g., the processor 910); a first graphic processor (e.g., the first graphic processor 915) configured to control the first display; and a second graphic processor (e.g., the second graphic processor 916) configured to control the second display.

According to various example embodiments of the present disclosure, an electronic device (e.g., the electronic device 101, 201, 202, 203, 901, 902. 903) may comprise: a housing (e.g., the housing 210, 310) comprising a first surface facing a first direction and a second surface facing a second direction opposite the first direction; a first display (e.g., the first display 261, 361, 961) viewable through the first surface; a bracket (e.g., the bracket 32) supporting the first display; a short-distance wireless communication antenna (e.g., the short-distance wireless communication antenna 397 of FIG. 3H) disposed between the first display and the bracket and configured to transmit/receive a short-distance wireless communication signal through a partial area of the first surface and the first display; a shield disposed between the short-distance wireless communication antenna and the bracket and configured to block transmission/reception of the short-distance wireless communication signal through the second surface; and a second display (e.g., the second display 262a, 262b, 262c, 362, 962) having a size smaller than a size of the first display and viewable through a partial area of the second surface.

According to various example embodiments, the first display may include an organic light-emitting diode (OLED) display.

According to various example embodiments of the present disclosure, an electronic device (e.g., the electronic device 101, 201, 202, 203, 901, 902. 903) may comprise: a housing (e.g., the housing 210, 310) comprising a first surface facing a first direction and a second surface facing a second direction opposite the first direction; a first display (e.g., the first display 261, 361, 961) viewable through the first surface; a bracket (e.g., the bracket 32) supporting the first display; a second display (e.g., the second display 262a, 262b, 262c, 362, 962) having a size smaller than a size of the first display and viewable through a partial area of the second surface; and a short-distance wireless communication antenna (e.g., the short-distance wireless communication antenna 397 of FIG. 3G) disposed in a bezel area of the second display and surrounding the second display.

According to various example embodiments, elements conventionally disposed on the first surface (front surface) of the electronic device may be disposed on the second surface (rear surface) such that the entire first surface can be used as a display area. In addition, the electronic device according to various embodiments may have an additional display on the second surface and may appropriately control the display on the first surface and the display on the second surface, thereby improving user convenience. Furthermore, various embodiments may provide various structures for disposing a short-distance wireless communication antenna in connection with an electronic device including displays on the first and second surfaces, respectively. In addition, various embodiments may provide various services using the displays disposed on the first and second surfaces.

The electronic device according to various example embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138, the memory 930) that is readable by a machine (e.g., the electronic device 101, the electronic device 201, 202, 203, the electronic device 901, 902, 903). For example, a processor (e.g., the processor 120, the processor 910) of the machine (e.g., the electronic device 101, the electronic device 201, 202, 203, the electronic device 901, 902, 903) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments thereof, it will be understood by those skilled in the art that various changes in form and details may be made without departing from the spirit and scope of the disclosure, including the appended claims.

What is claimed is:

1. A portable communication device comprising:
    a housing including a front surface and a rear surface opposite to the first surface, the housing including a first periphery, a second periphery opposite to and parallel to the first periphery, a third periphery longer than and substantially perpendicular to the first periphery and the second periphery, and a fourth periphery opposite to and parallel to the third periphery;

a first display disposed in the housing and visible via the front surface, the first display comprising a first size and a first resolution;

a second display at least partially disposed between the first display and a first portion of the rear surface when viewed in a first direction substantially parallel to the rear surface, the second display configured to be visible through the first portion of the rear surface, the second display comprising a second size smaller than the first size and a second resolution different from the first resolution;

a near field communication (NFC) antenna at least partially disposed between the first display and a second portion of the rear surface when viewed in the first direction;

a plurality of camera modules at least partially disposed between the first display and a third portion of the rear surface when viewed in the first direction, and visible through the third portion of the rear surface; and a flash at least partially disposed between the first display and a fourth portion of the rear surface when viewed in the first direction, and visible through the fourth portion of the rear surface, wherein the NFC antenna is at least partially disposed between the second display and the first periphery, when viewed in a second direction substantially perpendicular to the rear surface, wherein the plurality of camera modules are at least partially disposed between the second display and the third periphery, when viewed in the second direction, and wherein the flash is at least partially disposed between the second display and the third periphery, when viewed in the second direction.

2. The portable communication device of claim 1, wherein the housing is a metal housing packaging at least the second display.

3. The portable communication device of claim 1, wherein at least a portion of the housing protrudes from a surface of the second display toward an outside of the portable communication device.

4. The portable communication device of claim 1, further comprising:
a shielding sheet at least partially disposed between the first display and the NFC antenna, and not disposed between the NFC antenna and the second portion of the rear surface such that a wireless signal from the NFC antenna is configured to be radiated through the second portion of the rear surface.

5. The portable communication device of claim 1, further comprising:
a battery at least partially disposed between the first display and the NFC antenna when viewed in the first direction.

6. The portable communication device of claim 1, further comprising:
a processor and a luminance sensor at least partially disposed under the first display, wherein the processor is configured to measure an external luminance through the luminance sensor.

7. The portable communication device of claim 1, further comprising a processor configured to:
receive a call from an external device,
in response to receiving the call, display, via the first display, a first screen corresponding to the call, and
based on an identification that a condition related with a position and/or an orientation of the portable communication device is satisfied, display, via the second display, a second screen corresponding to the call.

8. The portable communication device of claim 7, wherein the processor is configured to:
based on the identification that the condition is satisfied, deactivate the first display.

9. The portable communication device of claim 8, wherein the processor is configured to:
perform displaying of the second screen such that the second screen includes a first graphical user interface asking whether to allow and/or reject the call.

10. The portable communication device of claim 1, wherein at least portions of the second display and the NFC antenna are aligned in a line toward the first direction.

11. The portable communication device of claim 1, further comprising a protective window disposed over at least portions of the NFC antenna and the second display.

12. The portable communication device of claim 11, wherein the protective window comprises reinforced glass.

13. The portable communication device of claim 1, further comprising at least one electronic component comprising circuitry and viewable through an area of the rear surface different from a partial area of the rear surface through which the second display is viewable.

14. The portable communication device of claim 1, wherein the second display comprises an organic light-emitting diode (OLED) display.

15. The portable communication device of claim 1, further comprising a fingerprint sensor disposed on the rear surface of the housing.

16. An electronic device comprising:
a housing including a front side and a rear side opposite to the first side, the housing including a first periphery, a second periphery opposite to and parallel with the first periphery, a third periphery longer than and substantially perpendicular to the first periphery and the second periphery, and a fourth periphery opposite to and parallel with the third periphery;

a first display disposed in the housing and visible through the front side, the first display comprising a first size and a first resolution;

a second display at least partially disposed between the first display and a first portion of the rear side when viewed in a first direction substantially parallel to the rear side, the second display being visible through the first portion of the rear side and comprising a second size smaller than the first size and a second resolution different from the first resolution;

an NFC antenna at least partially disposed between the first display and a second portion of the rear side when viewed in the first direction;

a plurality of camera modules at least partially disposed between the first display and a third portion of the rear side when viewed in the first direction, and usable via the third portion of the rear side; and a flash at least partially disposed between the first display and a fourth portion of the rear side when viewed in the first direction, and usable via the fourth portion of the rear side, wherein the NFC antenna is at least partially disposed between the second display and the first periphery, when viewed in a second direction substantially perpendicular to the rear side, wherein the plurality of camera modules are at least partially disposed between the second display and the third periphery, when viewed in the second direction, and wherein the flash is at least partially disposed between the second display and the third periphery, when viewed in the second direction.

17. The electronic device of claim 16, wherein the housing comprises metal for packaging the second display.

18. The electronic device of claim 16, wherein at least a portion of the housing protrudes from a surface of the second display toward an outside of the electronic device.

19. The electronic device of claim 16, further comprising:
a shielding sheet at least partially disposed between the first display and the NFC antenna, and not disposed between the NFC antenna and the second portion of the rear side such that a wireless signal from the NFC antenna is configured to be radiated through the second portion of the rear side.

20. The electronic device of claim 16, further comprising:
a battery at least partially disposed between the first display and the NFC antenna.

* * * * *